United States Patent [19]

Auerbach et al.

[11] Patent Number: 5,527,886
[45] Date of Patent: Jun. 18, 1996

[54] DYES CONTAINING 5-CYANO-2,4 OR 4,6-DICHLOROPYRIMIDYL FIBER-REACTIVE GROUPS

[75] Inventors: Günther Auerbach, Basel, Switzerland; Markus Dörr, Staufen, Germany; Paul Doswald, Münchenstein, Switzerland; Markus Gisler, Rheinfelden, Switzerland; Werner Koch; Helmut A. Moser, both of Oberwil, Switzerland; Roland Wald, Huningue, France

[73] Assignee: Sandoz Ltd., Basel, Switzerland

[21] Appl. No.: 899,570

[22] Filed: Jun. 16, 1992

Related U.S. Application Data

[63] Continuation-in-part of Ser. No. 627,168, Dec. 14, 1990, abandoned.

[30] Foreign Application Priority Data

Dec. 16, 1989 [DE] Germany .................. 39 41 620.8

[51] Int. Cl.$^6$ .................... C09B 62/08; C07F 9/02; C07F 3/10
[52] U.S. Cl. .................... 534/638; 544/327; 544/332
[58] Field of Search .................. 544/327, 332; 534/638

[56] References Cited

U.S. PATENT DOCUMENTS

| | | | |
|---|---|---|---|
| 3,305,540 | 2/1967 | Andrew et al. | 260/154 |
| 3,362,948 | 1/1968 | Andrew et al. | 260/146 |
| 4,766,206 | 8/1988 | Tzikas | 534/619 |
| 4,806,640 | 2/1989 | Harms et al. | 544/76 |
| 4,935,501 | 6/1990 | Tzikas | 534/634 |

FOREIGN PATENT DOCUMENTS

| | | |
|---|---|---|
| 203505 | 12/1986 | European Pat. Off. |
| 318785 | 6/1989 | European Pat. Off. |
| 345577 | 12/1989 | European Pat. Off. |
| 3800261 | 7/1989 | Germany |
| 63-110260 | 5/1989 | Japan |

Primary Examiner—C. Warren Ivy
Assistant Examiner—Raymond Covington
Attorney, Agent, or Firm—Robert S. Honor; Melvyn M. Kassenoff

[57] ABSTRACT

Fiber-reactive compounds of the formula $$X-O_2S-W_1-[F_c]-W_2-NR-Z,$$

and water-soluble salts thereof each cation of which is independently a non-chromophoric cation, and mixtures of such compounds or water-soluble salts,
wherein
  $F_c$ is a chromophore-containing radical of a monoazo, disazo, polyazo, formazan, anthraquinone, dioxazine, phenazine or azomethine dye, which is in metal-free or metal complex form,
  each of $W_1$ and $W_2$ is independently a direct bond or a bridging group which is attached to a carbon atom of an aromatic carbocyclic ring or to a carbon or nitrogen atom of an aromatic heterocyclic ring present in $F_c$,
  X is —CH=CH$_2$ or —C$_{2-4}$alkylene—Y, wherein Y is hydroxy or a group which can be split off under alkaline conditions,
  R is hydrogen, C$_{1-4}$alkyl or C$_{1-4}$alkyl monosubstituted by hydroxy, halo, cyano, —SO$_3$H, —OSO$_3$H or —COOH, and
  Z is

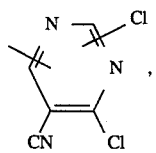

with the provisos as set forth herein.

22 Claims, No Drawings

DYES CONTAINING 5-CYANO-2,4 OR 4,6-DICHLOROPYRIMIDYL FIBER-REACTIVE GROUPS

This is a continuation-in-part of application Ser. No. 07/627,168, filed Dec. 14, 1990 and now abandoned.

This invention relates to chromophoric compounds containing fiber-reactive groups and a process for their preparation. These compounds are suitable for use as fiber-reactive dyes in any conventional dyeing and printing processes.

More particularly, the invention provides compounds of formula I,

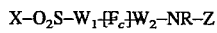  I and salts thereof,
wherein
$F_c$ is a chromophore-containing radical of a monoazo, disazo, polyazo, formazan, anthraquinone, dioxazine, phenazine or azomethine dye, which is in metal-free or metal complex form,
each of $W_1$ and $W_2$ is independently a direct bond or a bridging group which is attached to a carbon atom of an aromatic carbocyclic ring or to a carbon or nitrogen atom of an aromatic heterocyclic ring present in $F_c$,
X is —CH=CH$_2$ or —C$_{2-4}$alkylene-Y, wherein Y is hydroxy or a radical which can be split off under alkaline conditions, e.g., —OSO$_3$H, chloro, bromo, —OPO$_3$H$_2$, —SSO$_3$H, —OCOCH$_3$, —OCOC$_6$H$_5$ or —OSO$_2$CH$_3$,
R is hydrogen, C$_{1-4}$alkyl or C$_{1-4}$alkyl monosubstituted by hydroxy, halogen, cyano, —SO$_3$H, —OSO$_3$H or —COOH and
Z is

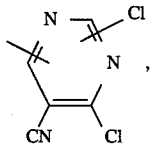

with the provisos that
(1) —[$F_c$]— does not contain any additional fiber-reactive group, and
(2) when —[$F_c$]— is the radical of a monoazo dye containing a group (x) as diazo component radical and a group (y) as coupling component radical,

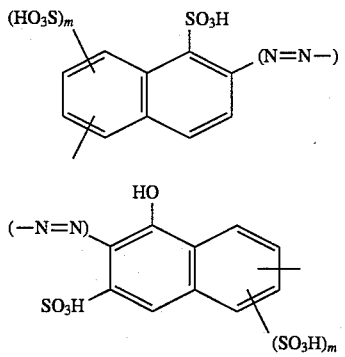

wherein each m is 0 or 1, then either
(2.1) (x) bears the —W$_2$—NR—Z group and (y) bears the —W1—SO$_2$—X group or
(2.2) (x) bears the —W$_1$—SO$_2$—X group, (y) bears the —W$_2$—NR—Z group, and the W$_2$ radical of said group is other than a direct bond, and mixtures of metal-free compounds and/or metal complexes of formula I and/or salts of such metal-free compounds and/or salts of such metal complexes.

In the specification, any alkyl or alkylene group present is linear or branched unless indicated otherwise. In any hydroxy-substituted alkyl or alkylene group which is attached to a nitrogen atom, the hydroxy group is preferably bound to a carbon atom which is not directly attached to this nitrogen atom. In any alkylene group containing two hydroxy groups, the hydroxy groups are bound to different carbon atoms which are preferably not adjacent to each other.

In any alkylene chain interrupted by —O— or —NR— (in which R is as defined above) which is attached to a nitrogen atom, preferably the —O— or —NR— is bound to a carbon atom of the alkylene chain which is not directly attached to the nitrogen atom.

Any halogen is preferably fluorine, chlorine or bromine; more preferably, it is chlorine or bromine, and especially chlorine.

Preferably, $F_c$ is the radical of a monoazo disazo formazan or anthraquinone dye which is in metal-free or metal complex form. If the chromophoric radical is in metal complex form, it is preferably in 1:1 copper complex form.

A bridging group $W_1$ when other than a direct bond is preferably a divalent radical —NR—, —A—, —*NR—A—, —*NRCO—A—, —*CONR—A—, —*SO$_2$NR—A—, —*NRCONR—A— or

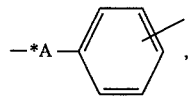

in which each A is independently C$_{1-8}$alkylene which is straight chain or branched and which more preferably is a linear alkylene group; a C$_{3-8}$alkylene group which is interrupted by —O— or —NR—; or a divalent radical

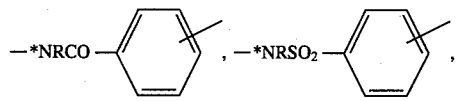

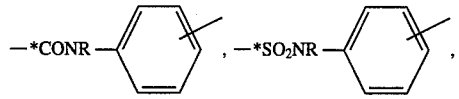

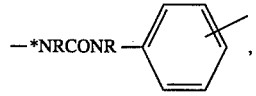

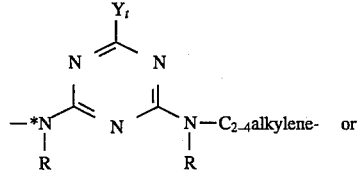

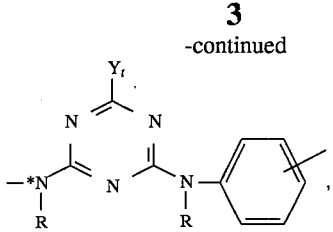

wherein $Y_t$ is hydroxy, —NHR, —NRR, —NRC$_{2-4}$alkylene—SO$_2$—X, —C$_{2-4}$alkylene—O—C$_{2-4}$alkylene—SO$_2$—X or

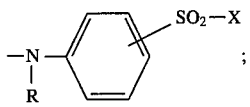

in the above-mentioned divalent radicals, each R and each X is independently as defined above, and the atom or free bond indicated with an asterisk is attached to ${-}[F_c]{-}$.

More preferably, $W_1$ is a direct bond, straight chain $C_{1-4}$alkylene, —C$_{2-3}$alkylene—O—C$_{2-3}$—alkylene—,

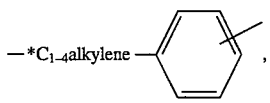

—*NR$_a$CONR$_a$—C$_{1-4}$alkylene— or

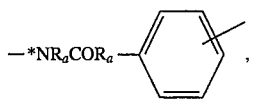

wherein each $R_a$ is independently as defined below, and each free bond in any phenyl ring is preferably in the meta- or para-position, and the asterisked atom or free bond is attached to ${-}[F_c]{-}$.

Most preferably, $W_1$ is a direct bond.

A bridging group $W_2$ when other than a direct bond is preferably a divalent radical —A$_1$—,

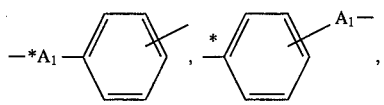

—*CO—A$_1$—, —*NR—A$_1$—, —*SO$_2$—A$_1$—, —*SO$_2$NR—A$_1$— or —*CONR—A$_1$—, wherein each A$_1$ is independently C$_{1-4}$alkylene or C$_{2-4}$ hydroxyalkylene, or $W_2$ is

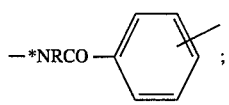

or —W$_2$—NR— is preferably

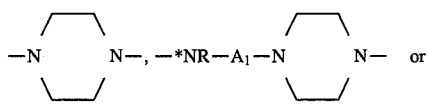

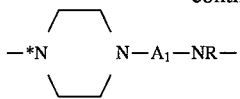

in which each A$_1$ is independently as defined above; in the divalent radicals mentioned with respect to $W_2$ each R is independently as defined above, and the atom or free bond indicated with an asterisk is attached to ${-}[F_c]{-}$.

More preferably, $W_2$ is a direct bond, C$_{1-4}$alkylene, C$_{2-4}$hydroxy-alkylene or

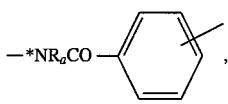

in which $R_a$ is independently as defined below, the free bond in the phenyl group is preferably in the meta- or para-position and the marked N-atom is attached to ${-}[F_c]{-}$.

Any Y as a radical which can be removed under alkaline conditions is preferably —OSO$_3$H.

X is preferably $X_a$, where $X_a$ is —CH=CH$_2$, —C$_{2-3}$alkylene—OH or —C$_{2-3}$alkylene—OSO$_3$H; more preferably X is $X_b$, where $X_b$ is —CH=CH$_2$, —CH$_2$CH$_2$OH or —CH$_2$CH$_2$OSO$_3$H; most preferably X is $X_c$, where $X_c$ is —CH=CH$_2$ or —CH$_2$CH$_2$OSO$_3$H, especially —CH$_2$CH$_2$OSO$_3$H.

Each R is preferably $R_a$, where each $R_a$ is independently hydrogen, methyl ethyl 2-hydroxyethyl, —(CH$_2$)$_r$—SO$_3$H, —(CH$_2$)$_r$—OSO$_3$H or —(CH$_2$)$_r$—COOH, in which r is 1, 2 or 3. More preferably each R is $R_b$, where each $R_b$ is independently hydrogen or methyl. Most preferably each R is hydrogen.

Preferred compounds of formula I which are in metal-free or metal complex form correspond to the following compounds of types (1) to (6).

In the below-mentioned formulae, the following symbols D$_1$ to D$_4$ are used as diazo component radicals:

D$_1$ is of formula (a)

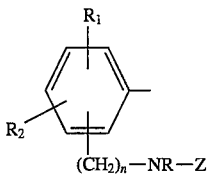

(a)

D$_2$ is of formula (b)

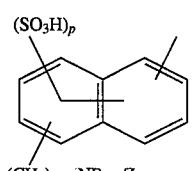

(b)

D$_3$ is of formula (c)

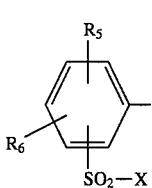

(c)

$D_4$ is of formula (d)

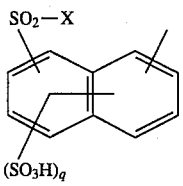

wherein each of $R_1$ and $R_2$ is independently hydrogen, halo, $C_{1-4}$alkyl, $C_{1-4}$alkoxy, —COOH or —$SO_3H$, $R_5$ is hydrogen, halo, $C_{1-4}$alkyl, $C_{1-4}$alkoxy, —COOH or —$SO_3H$, $R_6$ is hydrogen, halo, $C_{1-4}$alkyl or $C_{1-4}$alkoxy, n is 0 or 1, p is 1 or 2, q is 0, 1 or 2, and each R, X and Z is as defined above.

$D_1$ is preferably $D_{1a}$ and more preferably $D_{1b}$, where $D_{1a}$ is of formula ($a_1$)

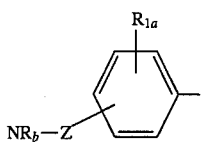

and $D_{1b}$ is a formula ($a_2$),

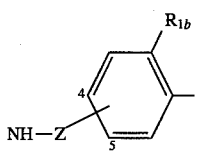

wherein $R_{1a}$ is hydrogen, methyl, methoxy, —COOH or —$SO_3H$, $R_{1b}$ is hydrogen, —COOH or —$SO_3H$, —NH—Z is in the 4- or 5-position, and $R_b$ and Z are as defined above.

$D_2$ is preferably $D_{2a}$ and more preferably $D_{2b}$, where $D_{2a}$ is of formula ($b_1$)

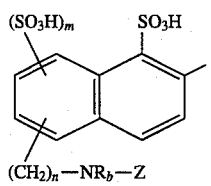

and $D_{2b}$ is of formula ($b_2$)

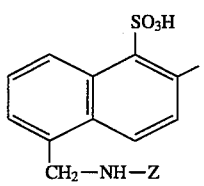

wherein m, n, $R_b$ and Z are as defined above.

$D_3$ is preferably $D_{3a}$ and more preferably $D_{3b}$, where $D_{3a}$ is of formula ($c_1$)

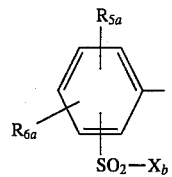

and $D_{3b}$ is of formula ($c_2$)

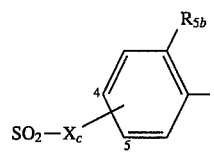

wherein $R_{5a}$ is hydrogen, methyl, methoxy, —COOH or —$SO_3H$, $R_{6a}$ is hydrogen, methyl or methoxy, $R_{5b}$ is hydrogen or —$SO_3H$, —$SO_2$—$X_c$ is in the 4- or 5-position, and $X_b$ and $X_c$ are as defined above.

$D_4$ is preferably $D_{4a}$ and more preferably $D_{4b}$, where $D_{4a}$ is a group of one of the formulae ($d_1$) to ($d_4$),

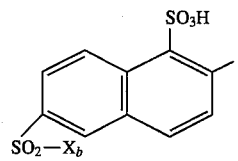

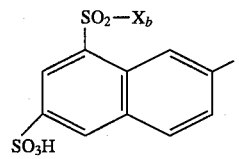

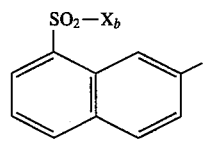

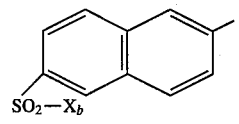

wherein $X_b$ is as defined above, and $D_{4b}$ is a group of one of the formulae ($d_1$) to ($d_3$), wherein each $X_b$ is $X_c$ where $X_c$ is as defined above.

$D_{1,2}$ is a diazo component radical $D_1$ or $D_2$, and $D_{3,4}$ is a diazo component radical $D_3$ or $D_4$.

Type (1): monoazo compounds, metal-free

1a)

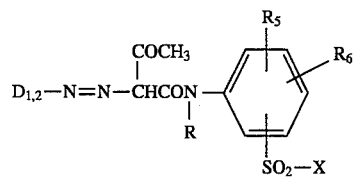

-continued

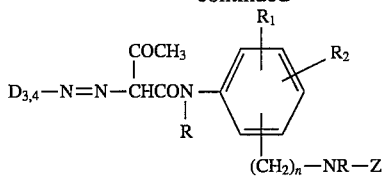

in which R, $R_1$, $R_2$, $R_5$, $R_6$, X, Z and n are as defined above;

1b)

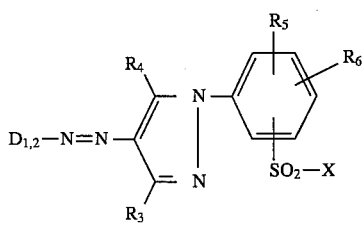

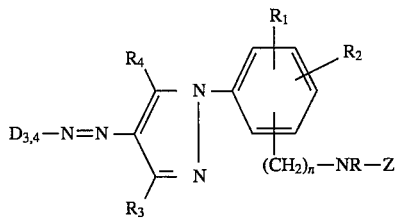

wherein
$R_3$ is —$CH_3$, —COOH or —$CONH_2$,
$R_4$ is hydroxy or —$NH_2$, and
R, $R_1$, $R_2$, $R_5$, $R_6$, X, Z and n are as defined above.
More preferred are compounds 1a) and 1b) in which
$D_{1,2}$ is $D_{1a}$ or $D_{2a}$, especially $D_{1b}$ or $D_{2b}$;
$D_{3,4}$ is $D_{3a}$ or $D_{4a}$, especially $D_{3b}$ or $D_{4b}$;
$R_5$ is $R_{5a}$, $R_6$ is $R_{6a}$, X is $X_b$, especially $X_c$ and
R is $R_b$, where each $R_{5a}$, $R_{6a}$, $X_b$, $X_c$ and $R_b$ is independently as defined above.

1c)

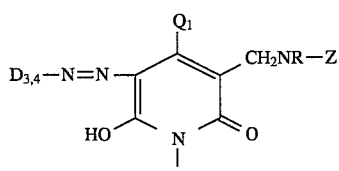

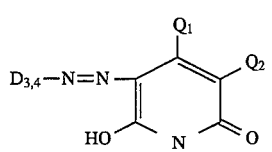

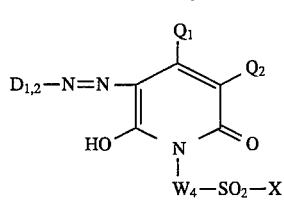

wherein
$R_{10}$ is hydrogen or $C_{1-4}$alkyl, each $Q_1$ is independently hydrogen, $C_{1-4}$alkyl, $C_{5-6}$cycloalkyl, phenyl or phenyl($C_{1-4}$alkyl) wherein the phenyl ring is unsubstituted or substituted by 1 to 3 substituents independently selected from $C_{1-4}$alkyl, $C_{1-4}$alkoxy, halo, —$SO_3H$ and —COOH, —$COR_{11}$ or $C_{1-4}$alkyl monosubstituted by —$SO_3H$, —$OSO_3H$ or —$COR_{11}$, wherein $R_{11}$ is hydroxy, —$NH_2$ or $C_{1-4}$alkoxy, each $Q_2$ is independently hydrogen, CN, —$SO_3H$, —$COR_{11}$, $C_{1-4}$, alkyl, $C_{1-4}$alkyl which is monosubstituted by hydroxy, halo, cyano, $C_{1-4}$alkoxy,

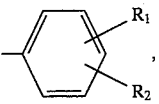

—$SO_3H$, —$OSO_3H$ or —$NH_2$,

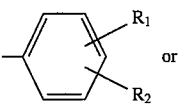

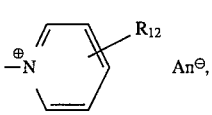

wherein
$R_1$, $R_2$ and $R_{11}$ are as defined above,
$R_{12}$ is hydrogen, $C_{1-4}$alkyl or $C_{2-4}$hydroxyalkyl, and
$An^{\ominus}$ is a non-chromophoric anion;
$W_3$ is —$C_{2-4}$alkylene— or —$C_{3-4}$hydroxyalkylene—,
$W_4$ is —$C_{2-4}$alkylene—, —$C_{2-3}$alkylene—O—$C_{2-3}$alkylene—,
—$C_{2-3}$alkylene—NR—$C_{2-3}$alkylene— or

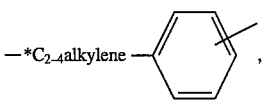

wherein the * denotes the carbon atom attached to the nitrogen atom of the pyridone ring, and each R, X and Z is as defined above.

Any non-chromophoric anion $An^{\ominus}$ is preferably a chloride or acetate ion.

More preferred are compounds 1c) in which $D_{3,4}$ is $D_{3a}$ or $D_{4a}$, particularly $D_{3b}$ or $D_{4b}$;
$D_{1,2}$ is $D_{1a}$ or $D_{2a}$, particularly $D_{1b}$ or $D_{2b}$,
$Q_1$ is $Q_{1a}$, where $Q_{1a}$ is hydrogen, methyl ethyl phenyl —$COR_{11}$, —$CH_2SO_3H$ or —$CH_2OSO_3H$; $Q_1$ is most preferably $Q_{1b}$, where $Q_{1b}$ is methyl or —$CH_2SO_3H$;
$Q_2$ is $Q_{2a}$, where $Q_{2a}$ is hydrogen, cyano, —$SO_3H$, —$COR_{11}$, methyl, ethyl or —$CH_2SO_3H$; $Q_2$ is most preferably $Q_{2b}$, where $Q_{2b}$ is hydrogen, —$CONH_2$ or —$CH_2SO_3H$;
R is $R_b$ and X is $X_b$, particularly $X_c$,
where $R_b$, $X_b$ and $X_c$ are as defined above.

1d)

-continued

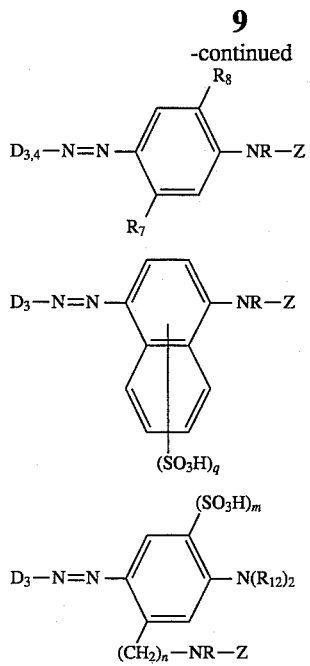

wherein

R$_7$ is hydrogen, C$_{1-4}$alkyl, C$_{1-4}$alkoxy, —NHCOC$_{1-4}$alkyl or —NHCONH$_2$, R$_8$ is hydrogen, C$_{1-4}$alkyl, C$_{1-4}$alkoxy or —SO$_3$H, m is 0 or 1, is 0 or 1, is 0, 1 or 2, and R, Z and each R$_{12}$ independently are as defined above.

More preferred are compounds 1d) wherein D$_{3,4}$ is D$_{3a}$ or D$_{4a}$, more preferably D$_{3b}$ or D$_{4b}$;

D$_3$ is D$_{3a}$, more preferably D$_{3b}$; and

R is R$_b$ as defined above.

Type (2): disazo compounds, metal-free

2a)

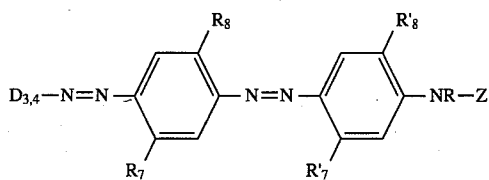

in which

R'$_7$ has one of the significances of R$_7$ and

R'$_8$ has one of the significances of R$_8$, but both independent thereof, and

R, R$_7$, R$_8$ and Z are as defined above.

More preferred are compounds 2a) in which D$_{3,4}$ is D$_{3a}$ or D$_{4a}$, especially D$_{3b}$ or D$_{4b}$, both R$_7$, and R$_8$, are hydrogen, and R is R$_b$ as defined above.

2b)

-continued

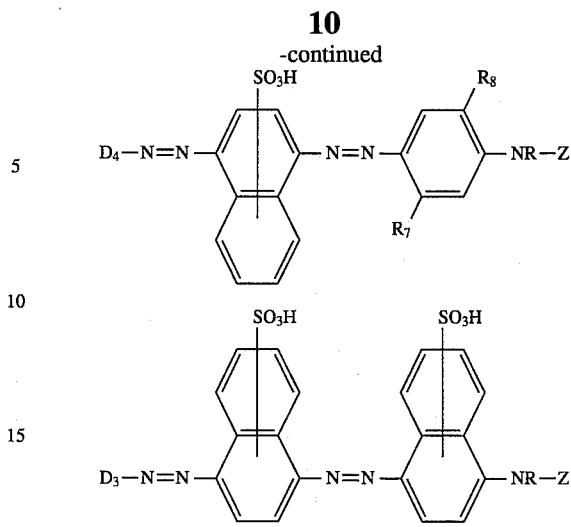

in which R$_7$, R$_8$, R and Z are as defined above.

More preferred are compounds 2b) in which

D$_4$ is D$_4$, particularly D$_{4b}$,

D$_3$ is D$_{3a}$, particularly D$_{3b}$, and R is R$_b$ as defined above.

Type (3): monoazo compounds 3a) metal-free

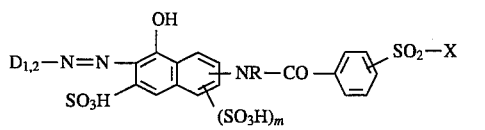

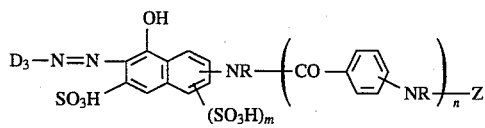

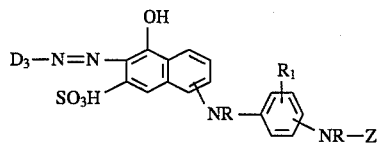

wherein m is 0 or 1, n is 0 or 1, and R, R1, X and Z are as defined above.

More preferred are compounds 3a) wherein

D$_{1,2}$ is D$_{1a}$ or D$_{2a}$, more preferably D$_{1b}$ or D$_{2b}$;

D$_3$ is D$_{3a}$, more preferably D$_{3b}$;

R$_1$ is R$_{1a}$;

X is X$_b$, more preferably X$_c$; and

R is R$_b$, where R$_{1a}$, X$_b$, X$_c$ and R$_b$ are as defined above.

3b) metal-containing, 1:1 copper complexes of compounds 3a)

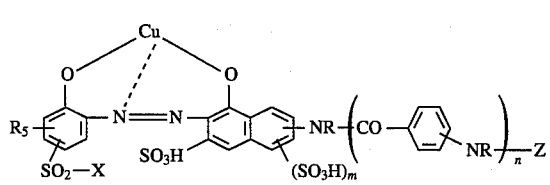

-continued

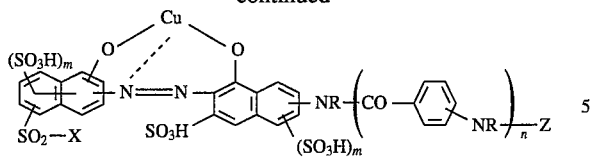

in which latter formula —O— and —N=N— are ortho to each other and are in the 1,2- or 2,1-positions,
  each m is independently 0 or 1,
  n is 0 or 1, and
  R, $R_5$, X and Z are as defined above;
or 1:2 metal complexes, particularly 1:2 cobalt or chromium complexes, which consist of
  either two monoazo compounds of the formula

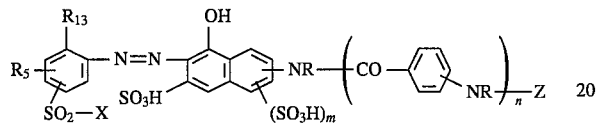

which may be the same or different,
wherein
  $R_{13}$ is hydroxy, —$NH_2$ or —COOH, and
  R, $R_5$, X, Z, m and n are as defined above,
  or one monoazo compound of the above formula and any other dye capable of forming a metal complex, particularly an appropriate azo or azomethine dye.
Type 4): disazo compounds, metal-containing, particularly 1:1 copper complexes

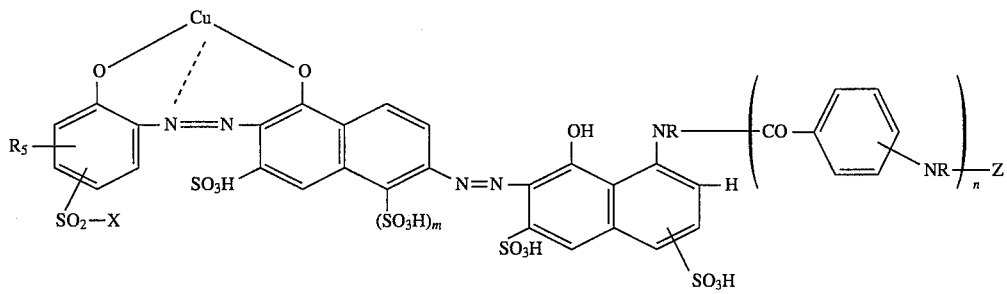

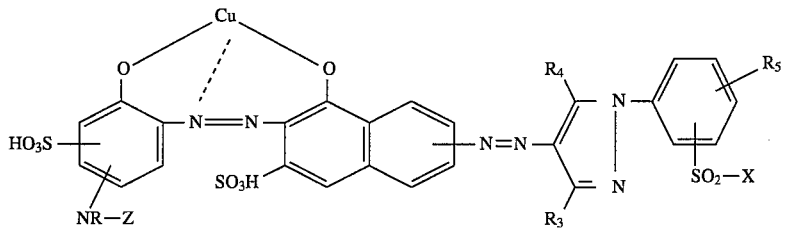

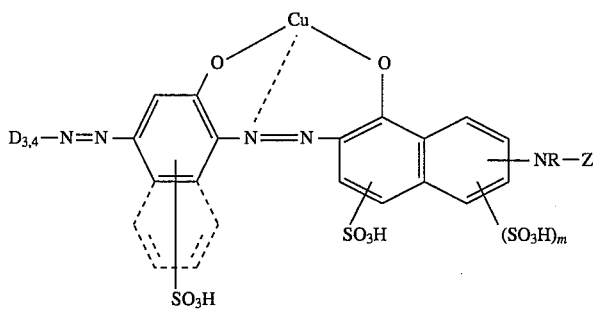

wherein m is 0 or 1, n is 0 or 1, and
R, $R_3$, $R_4$, $R_5$, X and Z are as defined above,
Type (5): formazan compounds

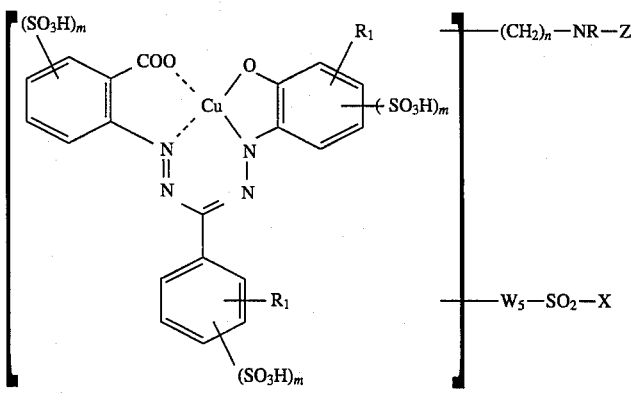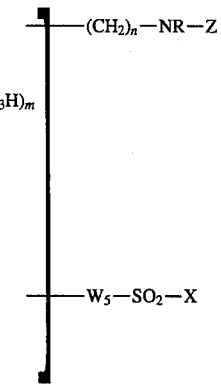

wherein the —$(CH_2)_n$—NR—Z and —$W_5$—$SO_2$—X groups may be bound to a carbon atom of any of the three phenyl rings, with the proviso that they are located on different phenyl rings, $W_5$ is —*NRCONR—$C_{2-4}$alkylene— or

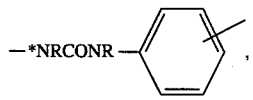, wherein the * denotes the nitrogen atom attached to the ring system, each m is independently 0 or 1,
n is 0 or 1, and
R, each $R_1$ independently, X and Z are as defined above.

Type (6): anthraquinone compounds

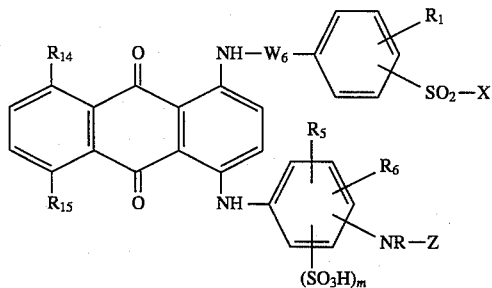

wherein
each of $R_{14}$ and $R_{15}$ is independently hydrogen, halo or hydroxy,
$W_6$ is a direct bond or —$C_{1-4}$alkylene—,
m is 0 or 1, and
R, $R_1$, $R_5$, $R_6$, X and Z are as defined above.

When a compound of formula I is in salt form, the cation associated with the sulfo and any carboxy groups is not critical and may be any one of those non-chromophoric cations conventional in the field of fiber-reactive dyes provided that the corresponding salts are water-soluble. Examples of such cations are alkali metal cations and unsubstituted and substituted ammonium cations, e.g., lithium, sodium, potassium, ammonium, mono-, di-, tri- and tetra-methylammonium, tri-ethylammonium and mono-, di- and tri-ethanolammonium.

The preferred cations are the alkali metal cations and ammonium, with sodium being the most preferred.

In a compound of formula I the cations of the sulfo and any carboxy groups can be the same or different, e.g., they can also be a mixture of the above-mentioned cations meaning that the compound of formula I can be in a mixed salt form.

The invention further provides a process for the preparation of compounds of formula I and mixtures thereof comprising reacting a compound of formula II $$X—O_2S—W_1\text{-}[F_c]\text{-}W_2—NHR \quad III$$

wherein $F_c$, $W_1$, $W_2$, X and R are as defined above, or a mixture of compounds of formula II with 5-cyano-2,4,6-trichloropyrimidine.

Any optional metallization may be effected before or after this condensation reaction.

Metal-free or metal-containing monoazo or disazo compounds of type (3) and type (4) may be preferably prepared by the reaction of an appropriate diazo component with an appropriate coupling component of which either the first or the second component has already been condensed with 5-cyano-2,4,6-trichloropyrimidine, and optionally after coupling by treating with a metal-donating compound to obtain the corresponding metal complex.

The compounds of formula I may be isolated in accordance with known methods, for example, by conventional salting out with alkali metal salt, filtering and drying optionally in vacuo and at slightly elevated temperatures.

Depending on the reaction and isolation conditions a compound of formula I is obtained in free acid or preferably salt form or even mixed salt form containing, for example, one or more of the above-mentioned cations. It may be converted from free acid form to a salt form or mixture of salt forms or vice versa or from one salt form to another by conventional means.

It should be noted that the group Z

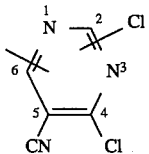

which is bound to the chromophore $F_c$ via the bridge —$W_2$—NR—, can occur in two isomeric forms, with the floating chlorine substituent in either the 2- or the 6-position, due to the non-selectivity of the condensation reaction with 5-cyano-2,4,6-trichloropyrimidine. The normally-occurring ratio of 2-position to 6-position is about 2:1. In general, it is preferred to use this mixture as it is without resorting to the isolation of a single isomer for use, but should this be desired it can be readily achieved by conventional methods.

The starting compounds of formula II and also the diazo and coupling components used according to the process variant are either known compounds or may be readily made from known materials using known methods.

The compounds of formula I and mixtures thereof are useful as fiber-reactive dyes for dyeing or printing hydroxy group- or nitrogen-containing organic substrates. Preferred substrates are leather and fiber material comprising natural or synthetic polyamides and, particularly, natural or regenerated cellulose such as cotton, viscose and spun rayon. The most preferred substrate is textile material comprising cotton.

Dyeing or printing may be effected in accordance with known methods conventional in the fiber-reactive dye field. Preferably, for the compounds of formula I the exhaust dyeing method is used at temperatures within the range of 30° to 600° C.

The compounds of this invention have good compatibility with known fiber-reactive dyes; they may be applied alone or in combination with appropriate fiber-reactive dyes of the same class having analogous dyeing properties such as common fastness properties and the extent of ability to exhaust from the dyebath onto the fiber. The dyeings obtained with such combination mixtures have good fastness properties and are comparable to those obtained with a single dye.

The compounds of formula I give good exhaust and fixation yields. Moreover, any unfixed compound can be easily washed off the substrate. The dyeings and prints obtained exhibit good dry and wet light fastness and also good wet fastness properties such as wash, water, sea water and sweat fastness. They also exhibit good resistance to oxidising agents such as chlorinated water, hypochlorite bleach, peroxide bleach and perborate-containing washing detergents.

The invention is further illustrated with reference to the following non-limiting examples, in which all parts are expressed by weight unless otherwise stated and all temperatures are in degrees Centigrade.

EXAMPLE 1

14 Parts of 4-aminophenyl-(2'-sulfatoethyl)sulfone are pasted with 50 parts of water. To this mixture 7 parts of 30% hydrochloric acid are added and the mixture is cooled to 00 with 50 parts of ice. Diazotization is effected under these conditions by adding 12.6 parts of a 4N sodium nitrite solution. After diazotization is completed, 9.8 parts of solid 1-(3-N-methylaminopropyl)-4-methyl-6-hydroxypyridone-2 are added. The coupling reaction is carried out at pH 7 (obtained by the addition of 8 parts of a 20% by weight solution of sodium carbonate). The thus formed compound of the formula

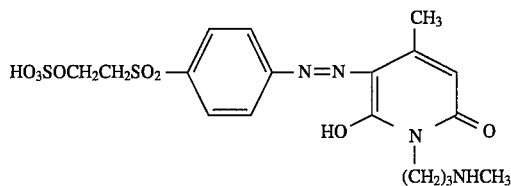

precipitates and is filtered off.

33.4 parts of this wet compound are stirred into 1000 parts of water, and 8 parts of 5-cyano-2,4,6-trichloropyrimidine which have been stirred for 10 minutes in 100 parts of an ice-water mixture, are added thereto. The pH of the reaction mixture is adjusted to 6.0 by the addition of 20 parts of a 10% by weight solution of sodium hydroxide; simultaneously, the temperature is elevated to 40°. After three hours the condensation is completed. The reaction mixture is diluted with 200 parts of water and filtered clear at 50°, and the product is salted out with sodium chloride. The thus obtained dye is filtered and dried; it has the formula

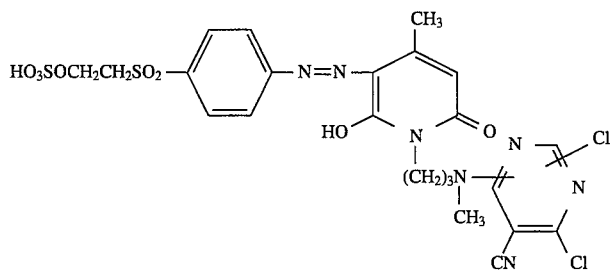

and dyes cotton a greenish-yellow shade. These dyeings exhibit good fastness properties.

EXAMPLE 2

14 Parts of 4-aminophenyl-(2'-sulfatoethyl)sulfone are diazotized as described in Example 1. To the resultant mixture 8.5 parts of 1-(3'-aminophenyl)-3-methylpyrazolone-5 in solid form are added. Coupling is effected at a pH of 7.0 (obtained by the addition of 33 parts of a 10% by weight solution of sodium hydroxide). After a 60 minute reaction time, the mixture is salted out with sodium chloride. The resinous residue is separated and dissolved in 300 parts of water. To this solution, 16 parts of 5-cyano-2,4,6-trichloropyrimidine (which have been treated in the same way as described in Example 1) is added. The pH is kept at 7.0 for an hour with the addition of 15 parts of a 10% by weight sodium hydroxide solution. Subsequently, the mixture is heated to 50° and filtered clear. The obtained dye is salted out by adding sodium chloride, filtered and dried. It has the formula

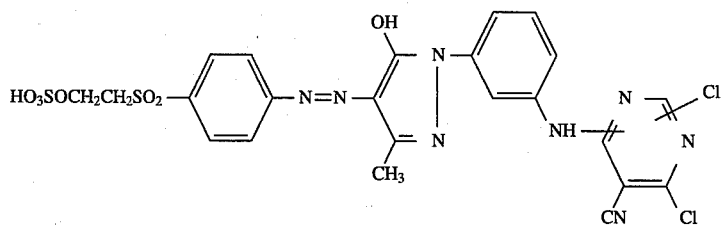

and dyes cotton in yellow tones. These dyeings exhibit good fastness properties.

EXAMPLES 3 TO 97

By analogy with the method described in Example 1 or 2, using appropriate starting compounds to form the desired chromophoric part $F_c$, further metal-free compounds of formula I may be prepared which are listed in the following Tables 1 to 9. At the top of each of these Tables the corresponding formula is given in which the symbols are as defined in the Table.

The compounds of Examples 3 to 97 may be applied to substrates comprising cellulose fibers, and particularly to textile material comprising cotton, according to conventional exhaust dyeing or printing processes, where dyeings and prints of the indicated shade are obtained. These dyeings and prints on cotton exhibit good light and wet fastness properties, and they are stable in the presence of oxidizing agents.

In all of the following formulae and Tables, the group Z is

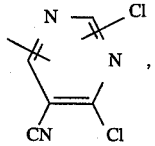

the group $Z_1$ is —$SO_2CH_2CH_2OSO_3H$.

TABLE 1 compounds of formula (T1)

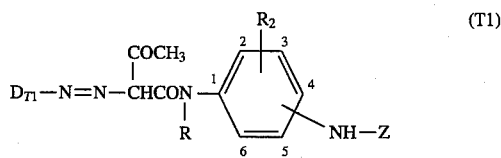

| Example No. | $D_{T1}$ | R | $R_2$ (position) | Position of —NH—Z |
|---|---|---|---|---|
| 3 | $Z_1$—⌬— | H | $SO_3H(2)$ | 5 |
| 4 | " | H | " | 4 |
| 5 | $Z_1$—⌬— | H | " | 5 |
| 6 | $Z_1$—⌬(OCH₃)(CH₃)— | H | " | 4 |
| 7 | " | CH₃ | " | 5 |
| 8 | $Z_1$—⌬(OCH₃)(OCH₃)— | H | " | 5 |
| 9 | $Z_1$—⌬(OCH₃)— | CH₃ | " | 4 |
| 10 | $Z_1$—⌬(SO₃H)— | H | H | 3 |
| 11 | " | H | H | 4 |
| 12 | $Z_1$—⌬(CH₃O)— | H | $SO_3H(2)$ | 5 |
| 13 | $Z_1$—naphthyl(SO₃H)— | H | H | 3 |

TABLE 1-continued compounds of formula (T1)

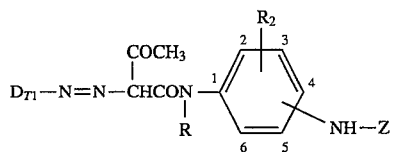

| Example No. | $D_{T1}$ | R | $R_2$ (position) | Position of $-NH-Z$ |
|---|---|---|---|---|
| 14 | $Z_1$ 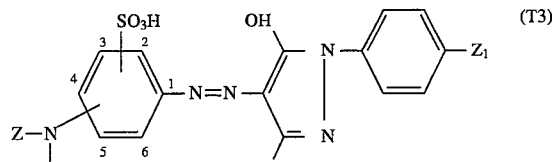 | H | $SO_3H(2)$ | 5 |

The dyeings and prints on cotton obtained with the dyes of Examples 3 to 14 have a greenish-yellow shade.

TABLE 2

Compounds of formula T2

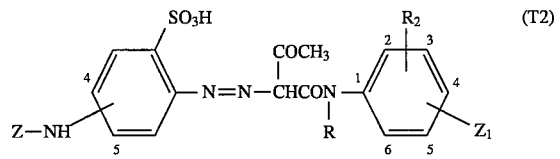

| Example No. | Position of $-NH-Z$ | R | $R_2$ (position) | Position of $-Z_1$ |
|---|---|---|---|---|
| 15 | 4 | H | H | 3 |
| 16 | 5 | H | H | 4 |
| 17 | 5 | $CH_3$ | H | 3 |
| 18 | 5 | H | $CH_3(2)$ | 4 |
| 19 | 4 | H | $OCH_3(2)$ | 5 |
| 20 | 4 | $CH_3$ | H | 4 |

The compounds of Examples 15 to 20 dye cotton a greenish-yellow shade.

TABLE 3

Compounds of formula T3

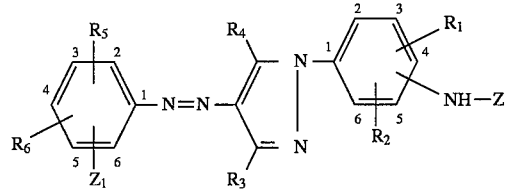

| Example No. | Position of $-SO_3H$ | R | Position of $-NR-Z$ | $R_3$ |
|---|---|---|---|---|
| 21 | 4 | H | 3 | $CH_3$ |
| 22 | 2 | H | 4 | COOH |
| 23 | 2 | $CH_3$ | 4 | $CH_3$ |
| 24 | 2 | H | 4 | " |
| 25 | 4 | H | 3 | COOH |
| 26 | 4 | $CH_3$ | 3 | " |
| 27 | 2 | H | 5 | $CH_3$ |

The compounds of Examples 21 to 27 dye cotton a greenish-yellow shade.

TABLE 4

Compounds of formula T4

| Example No. | Position of $-Z_1$ | $R_5$ | $R_6$ | $R_3$ | $R_4$ | $R_1$ | $R_2$ | Position of $-NH-Z$ |
|---|---|---|---|---|---|---|---|---|
| 28 | 3 | H | H | $CH_3$ | OH | H | H | 3 |
| 29 | 4 | $OCH_3(2)$ | H | COOH | OH | H | H | 4 |
| 30 | 4 | $SO_3H(2)$ | H | $CH_3$ | OH | H | H | 4 |
| 31 | 3 | H | H | COOH | OH | H | H | 4 |
| 32 | 3 | $OCH_3(4)$ | H | $CH_3$ | $NH_2$ | H | H | 3 |
| 33 | 3 | " | H | " | " | H | H | 3 |
| 34 | 4 | $OCH_3(2)$ | $CH_3(5)$ | " | OH | H | H | 4 |
| 35 | 4 | " | H | " | OH | H | H | 3 |
| 36 | 4 | " | $OCH_3(5)$ | COOH | OH | $SO_3H(2)$ | H | 3 |
| 37 | 4 | H | " | " | OH | " | H | 4 |
| 38 | 4 | $SO_3H(2)$ | H | $CH_3$ | OH | $SO_3H(3)$ | $CH_3(6)$ | 5 |
| 39 | 4 | " | H | COOH | OH | $SO_3H(2)$ | H | 4 |

The dyes of Examples 28 to 39 give greenish-yellow dyeings on cotton.

TABLE 5

Compounds of formula T5

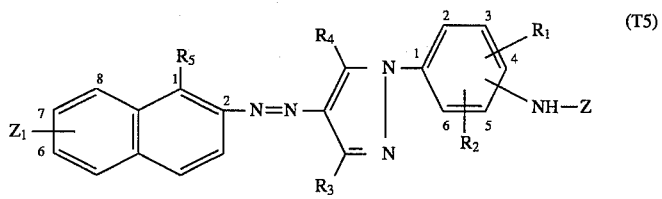

(T5)

| Example No. | Position of —$Z_1$ | $R_5$ | $R_3$ | $R_4$ | $R_1$ | $R_2$ | Position of —NH—Z |
|---|---|---|---|---|---|---|---|
| 40 | 6 | $SO_3H$ | $CH_3$ | OH | H | H | 3 |
| 41 | 6 | " | " | $NH_2$ | $SO_3H(2)$ | H | 3 |
| 42 | 8 | H | COOH | OH | $SO_3H(3)$ | $CH_3(6)$ | 5 |
| 43 | 8 | H | $CH_3$ | $NH_2$ | H | H | 3 |
| 44 | 6 | $SO_3H$ | " | OH | H | H | 4 |
| 45 | 6 | " | COOH | OH | $SO_3H(2)$ | H | 4 |
| 46 | 8 | H | $CH_3$ | OH | $SO_3H(3)$ | $CH_3(6)$ | 5 |
| 47 | 8 | H | COOH | OH | H | H | 4 |
| 48 | 6 | $SO_3H$ | $CH_3$ | OH | $SO_3H(2)$ | H | 4 |

The compounds of Examples 40 to 48 dye cotton a greenish-yellow shade.

TABLE 6

Compounds of formula T6

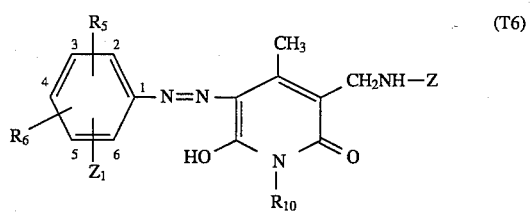

(T6)

| Example | Position of —$Z_1$ | $R_5$ | $R_6$ | $R_{10}$ |
|---|---|---|---|---|
| 49 | 4 | H | H | H |
| 50 | 4 | $OCH_3(2)$ | H | H |
| 51 | 4 | $SO_3H(2)$ | H | $C_2H_5$ |
| 52 | 3 | H | H | H |
| 53 | 3 | $OCH_3(4)$ | H | $CH_3$ |
| 54 | 3 | H | H | $C_2H_5$ |

TABLE 6-continued

Compounds of formula T6

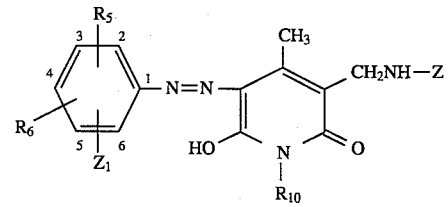

(T6)

| Example | Position of —$Z_1$ | $R_5$ | $R_6$ | $R_{10}$ |
|---|---|---|---|---|
| 55 | 4 | $OCH_3(2)$ | $CH_3(5)$ | $CH_3$ |
| 56 | 4 | " | $OCH_3(5)$ | $C_2H_5$ |
| 57 | 4 | H | H | " |
| 58 | 4 | $SO_3H(2)$ | H | H |

The dyeings on cotton obtained with the compounds of Examples 49 to 58 have a yellow shade.

TABLE 7

Compounds of formula T7

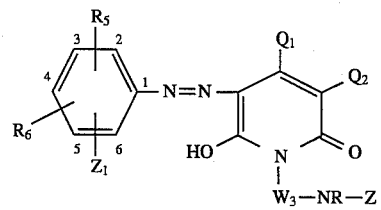

(T7)

| Example No. | Position of —$Z_1$ | $R_5$ | $R_6$ | $Q_1$ | $Q_2$ | $W_3$ | R |
|---|---|---|---|---|---|---|---|
| 59 | 4 | H | H | $CH_3$ | H | —$CH_2CH_2$— | H |
| 60 | 4 | $SO_3H(2)$ | H | " | —$CONH_2$ | —*$CH_2CH$—$CH_3$ | H |

TABLE 7-continued

Compounds of formula T7

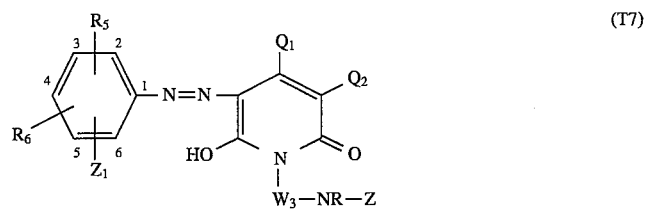

(T7)

| Example No. | Position of $-Z_1$ | $R_5$ | $R_6$ | $Q_1$ | $Q_2$ | $W_3$ | R |
|---|---|---|---|---|---|---|---|
| 61 | 4 | H | H | " | " | $-CH_2CH_2-$ | H |
| 62 | 3 | H | H | " | H | $-CH_2CH_2CH_2-$ | H |
| 63 | 4 | $OCH_3(2)$ | H | " | H | " | $CH_3$ |
| 64 | 3 | H | H | " | H | " | " |
| 65 | 4 | $OCH_3(2)$ | H | " | $-CH_2SO_3H$ | " | " |
| 66 | 4 | H | H | $-CH_2SO_3H$ | H | $-CH_2CH_2-$ | H |
| 67 | 4 | $OCH_3(2)$ | $CH_3(5)$ | $CH_3$ | $-CONH_2$ | $-*CH_2CH-CH_3$ | H |
| 68 | 3 | " | H | " | " | $-CH_2CH_2-$ | H |
| 69 | 3 | " | $OCH_3(5)$ | " | H | $-CH_2CH_2CH_2-$ | $CH_3$ |
| 70 | 3 | H | H | " | $-CONH_2$ | " | " |
| 71 | 3 | $SO_3H(2)$ | H | $-CH_2SO_3H$ | " | $-CH_2CH_2-$ | H |
| 72 | 3 | " | H | $CH_3$ | H | $-*CH_2CH-CH_3$ | H |
| 73 | 3 | " | H | " | $-CH_2SO_3H$ | $-CH_2CH_2CH_2-$ | $CH_3$ |

In $W_3$ the * denotes the carbon atom bound to the nitrogen atom of the pyridone ring.

The compounds of Examples 59 to 73 dye cotton in yellow tones.

TABLE 8

Compounds of formula T8

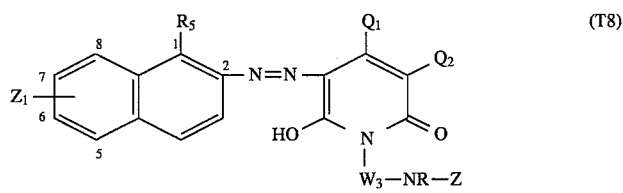

(T8)

| Example No. | Position of $-Z_1$ | $R_5$ | $Q_1$ | $Q_2$ | $W_3$ | R |
|---|---|---|---|---|---|---|
| 74 | 6 | H | $CH_3$ | H | $-CH_2CH_2-$ | H |
| 75 | 6 | H | $-CH_2SO_3H$ | H | $-*CH_2CH-$ <br> $\quad\quad\mid$ <br> $\quad\quad CH_3$ | H |
| 76 | 6 | H | $CH_3$ | $-CONH_2$ | $-CH_2CH_2CH_2-$ | $CH_3$ |
| 77 | 7 | H | " | $-CH_2SO_3H$ | $-CH_2CH_2-$ | H |
| 78 | 8 | $SO_3H$ | " | H | $-CH_2CH_2CH_2-$ | $CH_3$ |
| 79 | 6 | H | " | H | " | " |
| 80 | 8 | $SO_3H$ | $-CH_2SO_3H$ | $-CONH_2$ | " | " |
| 81 | 6 | " | $CH_3$ | H | " | H |
| 82 | 7 | " | " | H | $-CH_2CH_2-$ | H |
| 83 | 7 | H | " | $-CH_2SO_3H$ | $-*CH_2CH-$ <br> $\quad\quad\mid$ <br> $\quad\quad CH_3$ | H |
| 84 | 8 | H | " | " | " | H |

In $W_3$ the * denotes the carbon atom bound to the nitrogen atom of the pyridone ring.

Each compound of Examples 74 to 84 dyes cotton a yellow shade.

TABLE 9

Compounds of formula T9

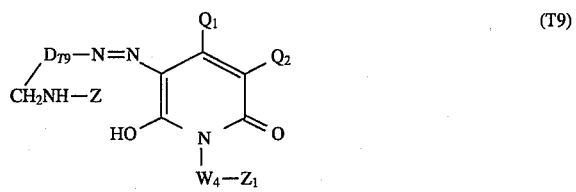
(T9)

| Example No. | $D_{T9}$ | $Q_1$ | $Q_2$ | $W_4$ |
|---|---|---|---|---|
| 85 | 3,5-disubstituted phenyl with $SO_3H$ (*) | $CH_3$ | $-CH_2SO_3H$ | $-*CH_2CH_2-$ (1,4-phenylene) |
| 86 | 2,4,6-trisubstituted phenyl with $SO_3H$, $SO_3H$ (*) | $-CH_2SO_3H$ | CN | " |
| 87 | " | $CH_3$ | H | " |
| 88 | 2,4-disubstituted phenyl with $SO_3H$ (*) | " | H | $-CH_2CH_2OCH_2CH_2-$ |
| 89 | " | " | $-CH_2SO_3H$ | " |
| 90 | " | " | $-CONH_2$ | $-*CH_2CH_2-$ (1,3-phenylene) |
| 91 | 2,5-disubstituted phenyl with $SO_3H$ (*) | " | H | " |
| 92 | " | " | $-CONH_2$ | $-CH_2CH_2OCH_2CH_2-$ |
| 93 | naphthyl with $SO_3H$ (1,2,5-substituted) (*) | $-CH_2SO_3H$ | H | " |
| 94 | " | $CH_3$ | H | $-*CH_2CH_2-$ (1,4-phenylene) |
| 95 | " | " | $-CONH_2$ | " |
| 96 | " | " | $-CH_2SO_3H$ | " |

TABLE 9-continued

Compounds of formula T9

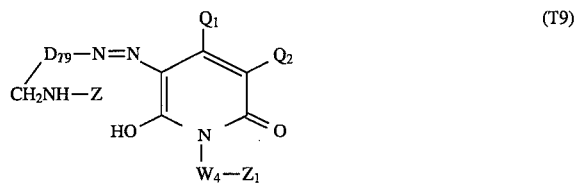

(T9)

| Example No. | $D_{T9}$ | $Q_1$ | $Q_2$ | $W_4$ |
|---|---|---|---|---|
| 97 | " | " | H |  —*CH$_2$CH$_2$— |

In $W_4$ the marked carbon atom is bound to the nitrogen atom of the pyridone ring; in $D_{T9}$ the marked free bond is attached to the azo group.

The compounds of Examples 85 to 97 dye cotton a yellow shade. These dyeings exhibit good light and wet fastness properties and are stable in the presence of oxidizing agents.

EXAMPLE 98

36.1 Parts of 4-amino-3-sulfophenyl-(2'-sulfatoethyl)sulfone are stirred into 200 parts of water. The resultant pH is less than 1. At 0°–50° diazotisation is effected according to conventional method using 25 parts of a 4N sodium nitrite solution. The obtained diazonium salt compound is reacted, at a temperature of 0° and pH 4.5, with 15.1 parts of 3-aminophenyl urea. After coupling has been completed, the suspension is filtered, and the residue is then stirred into 200 parts of water. To this mixture 22.9 parts of 5-cyano-2,4,6-trichloropyrimidine is added, and the reaction is carried out at pH 7.0. After three hours at 35° the reaction is completed. The dye thus formed is salted out with sodium chloride, collected by filtration and dried. It has the formula

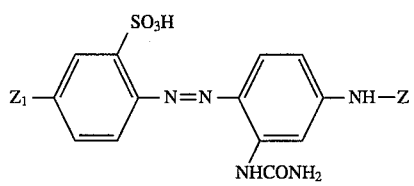

and dyes cotton a yellow shade. These dyeings exhibit good fastness properties.

EXAMPLES 99 TO 112

By analogy with the method described in Example 98, using appropriate starting compounds, further metal-free monoazo compounds may be prepared. They are of formula T10

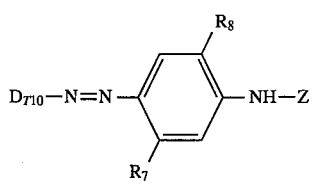

(T10)

in which the symbols are as defined in Table 10. The compounds of Examples 99 to 112 dye cotton a yellow

TABLE 10 compounds of formula (T10)

| Example No. | $D_{T10}$ | $R_7$ | $R_8$ |
|---|---|---|---|
| 99 | $Z_1$—⟨phenyl⟩— | —NHCONH$_2$ | H |
| 100 | " | —NHCOCH$_3$ | H |
| 101 | " | H | OCH$_3$ |
| 102 | $Z_1$—⟨phenyl⟩— | —NHCONH$_2$ | H |
| 103 | " | CH$_3$ | CH$_3$ |
| 104 | " | OCH$_3$ | OCH$_3$ |
| 105 | $Z_1$—⟨phenyl-SO$_3$H⟩— | —NHCOCH$_3$ | H |
| 106 | " | CH$_3$ | H |
| 107 | " | " | OCH$_3$ |
| 108 | $Z_1$—⟨naphthyl-SO$_3$H⟩— | —NHCONH$_2$ | H |
| 109 | $Z_1$—⟨naphthyl-SO$_3$H⟩— | " | H |

TABLE 10-continued compounds of formula (T10)

| Example No. | $D_{T10}$ | $R_7$ | $R_8$ |
|---|---|---|---|
| 110 | 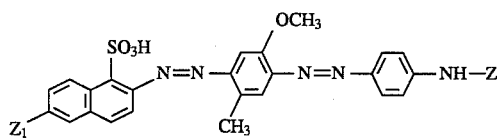 (Z₁ naphthyl with SO₃H) | $CH_3$ | $OCH_3$ |
| 111 | Z₁ (naphthyl) | " | " |
| 112 | " | $-NHCOCH_3$ | H |

EXAMPLE 113

41.1 Parts of 2-amino-1-sulfonaphthyl-6-(2'-sulfatoethyl) sulfone is stirred into 250 parts of water whereby a pH less than 1 results. Diazotization is carried out by adding 25 parts of a 4N sodium nitrite solution at 0°–5°. The diazonium salt compound is reacted with 13.7 parts of 1-amino-2-methoxy-5-methylbenzene at a temperature not higher than 5° and at pH 5. The resulting product is further diazotized with 25 parts of a 4N sodium nitrite solution in the presence of 50 parts of a 30% by weight solution of hydrochloric acid, followed by a coupling reaction in the presence of 20.5 parts of aniline-ω-methanesulfonic acid. Coupling is effected at a temperature not higher than 100° and at pH 4.5. After the reaction has been completed, the pH is adjusted to about 13 by the addition of sodium hydroxide solution. Then, at a temperature not higher than 300, saponification is effected by slowly adding 17 parts of a 40% by weight hydrogen peroxide dropwise. The reaction of the resultant free amino group with 22.9 parts of 5-cyano-2,4,6-trichloropyrimidine is carried out at 35° and at pH of 7.0. After conventional isolation, the dye of the formula

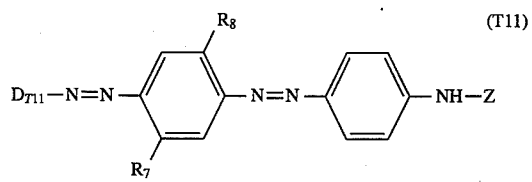

is obtained in the form of a yellowish-brown powder. On cotton this dye gives orange dyeings which exhibit good fastness properties.

EXAMPLE 114

If instead of the 41.1 parts of 2-amino-1-sulfonaphthyl-6-(2'-sulfatoethyl)sulfone used in Example 113, 28.1 parts of 4-amino-phenyl-(2'-sulfatoethyl)sulfone which were stirred into 200 parts of water is used, and otherwise the preparation method described in Example 113 is applied accordingly, the dye having the formula

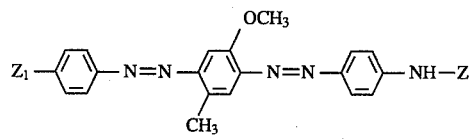

is obtained which dyes cotton an orange shade. These dyeings exhibit good light and wet fastness properties and are resistant to influences of oxidation.

EXAMPLES 115 TO 125

By analogy with the method described in Example 113 or 114, using appropriate starting compounds, further disazo compounds which are metal-free may be prepared. They correspond to formula (T11)

$$D_{T11}-N=N-\underset{R_7}{\overset{R_8}{\text{C}_6H_2}}-N=N-C_6H_4-NH-Z \qquad (T11)$$

in which the symbols are as defined in Table 11. The compounds of Examples 115 to 125 dye cotton in orange tones. These dyeings have good fastness properties.

TABLE 11 compounds of formula (T11)

| Example No. | $D_{T11}$ | $R_7$ | $R_8$ |
|---|---|---|---|
| 115 | Z₁—(phenyl) | H | $OCH_3$ |
| 116 | " | $-NHCOCH_3$ | H |
| 117 | " | $-NHCONH_2$ | H |
| 118 | Z₁—(phenyl, meta) | $CH_3$ | H |
| 119 | " | $OCH_3$ | $OCH_3$ |
| 120 | Z₁—(phenyl with SO₃H) | $CH_3$ | H |
| 121 | Z₁—(naphthyl with SO₃H) | " | $OCH_3$ |
| 122 | " | $-NHCOCH_3$ | H |
| 123 | Z₁—(naphthyl with SO₃H) | $CH_3$ | H |

TABLE 11-continued compounds of formula (T11)

| Example No. | $D_{T11}$ | $R_7$ | $R_8$ |
|---|---|---|---|
| 124 | (Z₁-substituted naphthalene) | " | H |
| 125 | " | —NHCOCH₃ | H |

EXAMPLE 126

23.9 Parts of 2-amino-5-hydroxynaphthalene-7-sulfonic acid are stirred into 300 parts of water at 25° and are dissolved by the addition of 13 parts of a 30% by weight solution of sodium hydroxide.

22.9 Parts of 5-cyano-2,4,6-trichloropyrimidine is dissolved in 120 parts of acetone, and the solution is stirred into a mixture of 120 parts of ice and 60 parts of water. To this mixture the solution of 2-amino-5-hydroxynaphthalene-7-sulfonic acid described in the previous paragraph is added dropwise over a period of 30 minutes at 0°–5° during which time, a pH of 2.4–2.7 is maintained by the addition of dilute sodium carbonate solution. Stirring is effected until no free amino group is detectable.

The resultant suspension is added to the diazonium salt compound of 31.1 parts of 2-amino-1-methoxy-4-(2'-sulfatoethyl) sulfonylbenzene which has been prepared in accordance with conventional methods. At 0°–5°, the pH of the coupling mixture is adjusted to 7.1 by adding dilute sodium carbonate solution. Stirring is effected at the same pH until coupling is completed. The dye thus formed is salted out and isolated. After drying the dye of the formula

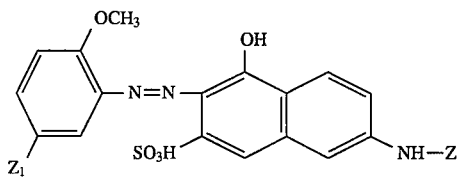

is obtained in form of a dark red powder which dissolves in water with a red color and dyes cotton in scarlet tones. These dyeings exhibit good light and wet fastness properties and are resistant towards oxidative influences.

EXAMPLE 127

To a suspension consisting of 23.9 parts of 2-amino-5-hydroxy-naphthalene-7-sulfonic acid and 22.9 parts of 5-cyano-2,4,6-trichloropyrimidine which has been prepared in accordance with the method described in Example 126, the diazonium salt solution of 29.7 parts of 2-amino-1-hydroxy-4-(2'-sulfatoethyl)sulfonylbenzene prepared in conventional manner, is added at 5°–8° over a period of 30 minutes. The pH is maintained at 8–9 by the simultaneous addition of dilute sodium carbonate solution. After the coupling reaction is completed, the pH of the reaction mixture is adjusted to 5.5 by adding hydrochloric acid. Then, an aqueous solution of 23.7 parts of copper sulfate·5H₂O is added dropwise over a period of 30 minutes, keeping the pH of the mixture at 5.5–6.5 by the dropwise addition of dilute sodium carbonate solution. After coppering is complete, the product is salted out and isolated. After drying the dye of the formula

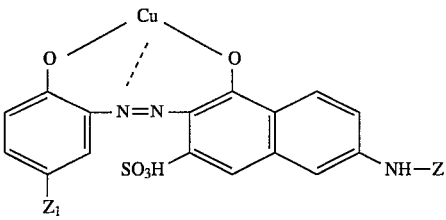

is obtained in form of a dark powder which dissolves in water with bordeaux-red colour and dyes cotton in bordeaux-red tones. These dyeings have good light and wet fastness properties and are resistant towards oxidative influences.

EXAMPLE 128

6.1 Parts of 3-amino-5-sulfophenyl-(2'-sulfatoethyl)sulfone is stirred into 200 parts of water, whereby a pH below 1 results. Diazotization is effected in conventional manner with 25 parts of a 4N sodium nitrite solution at a temperature not higher than 5°. The coupling reaction is carried out using 41.1 parts of the condensation product of 2-amino-5-hydroxynaphthalene-7-sulfonic acid with 5-cyano-2,4,6-trichloropyrimidine prepared as described in Example 126, at room temperature and pH 5–6. Subsequently, oxidative coppering is effected at room temperature using 25 parts of copper sulfate·5H₂O in the presence of 58 parts of sodium acetate and 8 parts of borax, during which 48 parts of 40% by weight hydrogen peroxide is added dropwise to the reaction mixture over a period of 15 minutes. After a further 30 minutes, the coppering is complete and the thus formed dye is isolated. It is of the formula

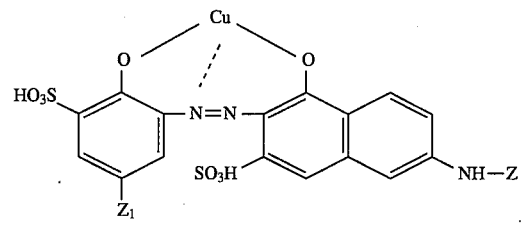

and is obtained in form of a dark powder. This dye gives ruby-red dyeings on cotton which exhibit good fastness properties.

EXAMPLE 129

By analogy with the method described in Example 128 using as starting compound the condensation product of 3-amino-5-nitrobenzene-sulfonic acid and 5-cyano-2,4,6-trichloropyrimidine in which product the nitro group has been reduced and the resulting free amino group has been diazotised, from which by coupling with 1-hydroxy-6-(2'-sulfatoethyl)sulfonylnaphthalene-3-sulfonic acid and finally oxidative coppering, the dye of the formula

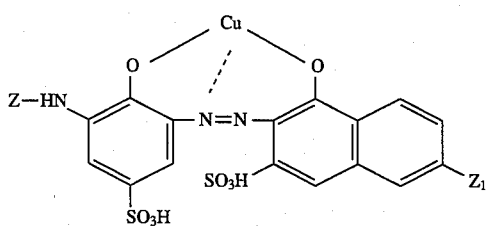

is obtained; it dyes cotton in bluish ruby-red tones. These dyeings exhibit very good fastness properties.

EXAMPLE 130

23 Parts of 5-cyano-2,4,6-trichloropyrimidine are dissolved in 120 parts of acetone; this solution is stirred into a mixture of 60 parts of water and 100 parts of ice. To the resultant cold suspension, an ice-cold solution of 21.9 parts of 1-(3'-aminobenzoylamino)-8-hydroxy-naphthalene-3,6-disulfonic acid in water which has been adjusted to pH 5, is added, while simultaneously adding a dilute sodium carbonate solution in such a way that the pH of the reaction mixture is kept at 4.5. After the condensation is complete, the pH of the suspension is adjusted to 6. To this suspension the diazonium salt compound of 23.3 parts of 4-aminophenyl-(2'-sulfatoethyl)sulfone (prepared according to a conventional method) is added at 0°–50°, and the pH of the mixture is maintained at 6–6.5 by the addition of sodium carbonate solution. The dye thus obtained is salted out with sodium chloride, isolated by filtration and dried. It has the formula

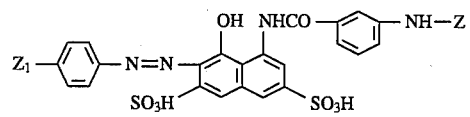

and dyes cotton a brilliant bluish-red shade. These dyeings exhibit notably good light and wet fastness properties and are resistant towards oxidative influences.

EXAMPLES 131 TO 162

By analogy with the method described in Example 130, using appropriate starting materials, further metal-free monoazo compounds may be prepared which are listed in the following Tables 12 and 13. At the top of each of these Tables the corresponding formula is given in which the symbols are as defined in Tables 12 and 13. The compounds of Examples 131 to 162 dye cotton a brilliant bluish-red shade. The dyeings show good fastness properties.

TABLE 12 compounds of formula T12

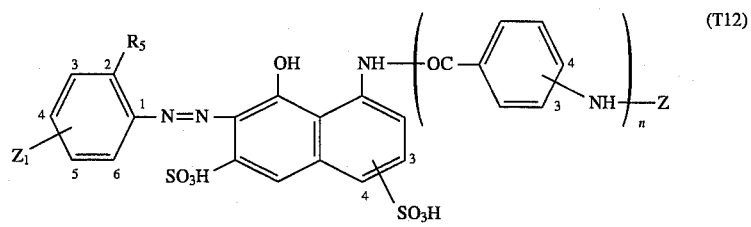

| Example No. | Position of $-Z_1$ | $R_5$ | Position of $-SO_3H$ | n | Position of $-NH-Z$ |
|---|---|---|---|---|---|
| 131 | 4 | H | 3 | 1 | 4 |
| 132 | 4 | $SO_3H$ | 3 | 1 | 4 |
| 133 | 4 | H | 4 | 1 | 4 |
| 134 | 4 | H | 4 | 1 | 3 |
| 135 | 4 | $SO_3H$ | 4 | 1 | 3 |
| 136 | 4 | " | 3 | 1 | 3 |
| 137 | 4 | " | 4 | 1 | 4 |
| 138 | 4 | H | 3 | 0 | — |
| 139 | 4 | H | 3 | 0 | — |
| 140 | 4 | $SO_3H$ | 3 | 0 | — |
| 141 | 4 | " | 4 | 0 | — |
| 142 | 3 | H | 3 | 1 | 3 |
| 143 | 3 | H | 3 | 1 | 4 |
| 144 | 3 | H | 4 | 1 | 4 |
| 145 | 3 | H | 4 | 1 | 3 |
| 146 | 3 | H | 3 | 0 | — |
| 147 | 3 | H | 4 | 0 | — |

TABLE 13 compounds of formula (T13)

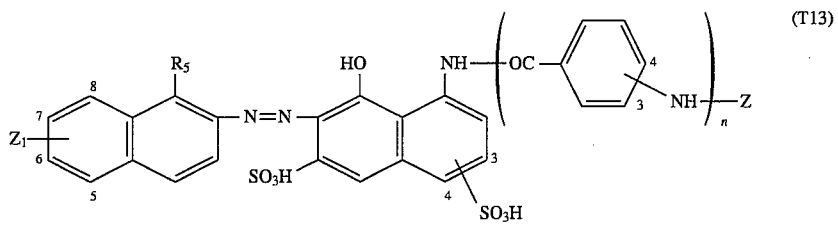

| Example No. | $R_5$ | Position of $-Z_1$ | Position of $-SO_3H$ | n | Position of $-NH-Z$ |
|---|---|---|---|---|---|
| 148 | $SO_3H$ | 6 | 3 | 1 | 3 |
| 149 | " | 6 | 3 | 1 | 4 |
| 150 | " | 6 | 4 | 1 | 4 |
| 151 | " | 6 | 4 | 1 | 3 |
| 152 | H | 6 | 3 | 0 | — |
| 153 | H | 6 | 4 | 0 | — |
| 154 | $SO_3H$ | 8 | 3 | 1 | 3 |
| 155 | " | 8 | 3 | 1 | 4 |
| 156 | " | 8 | 4 | 1 | 3 |
| 157 | " | 8 | 4 | 1 | 4 |
| 158 | H | 8 | 4 | 0 | — |
| 159 | H | 8 | 3 | 1 | 3 |
| 160 | H | 8 | 3 | 1 | 4 |
| 161 | H | 8 | 4 | 1 | 3 |
| 162 | H | 8 | 3 | 0 | — |

EXAMPLE 163

29.7 Parts of 1-amino-2-hydroxy-5-(2'-sulfatoethyl)sulfonylbenzene is diazotized in known manner and added to 23.9 parts of 2-amino-5-hydroxynaphthalene-7-sulfonic acid. The pH of this mixture is slowly adjusted to 8 by adding dilute sodium carbonate solution. The reaction temperature is 0°–50°. To the monoazo compound thus formed 6.9 parts of sodium nitrite is added and the reaction mixture is slowly added dropwise to hydrochloric acid at 00°–30°. To the resultant diazonium salt compound, 61 parts of the coupling component of the formula

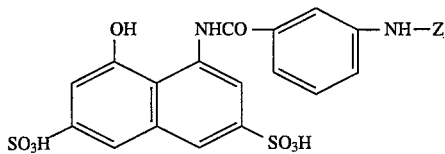

which has been prepared in accordance with the method described in Example 130, are added. By the dropwise addition of dilute sodium carbonate solution the pH of the reaction mixture is slowly adjusted to 6.5–7. After coupling has been completed the pH of the dye solution is adjusted to 5.5 by adding hydrochloric acid. To this solution an aqueous solution of 24.9 parts of copper sulfate·5H$_2$O is added dropwise over a period of 30 minutes. Simultaneously, the pH of the reaction mixture is kept at 5.5–6.5 by adding sodium carbonate solution. After coppering is complete, the dye is isolated by salting out and filtration and is dried. It has the formula

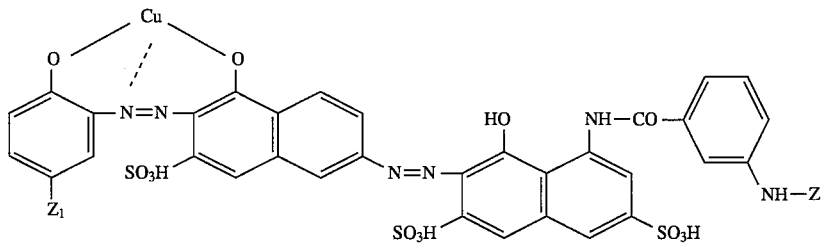

and dyes cotton in navy-blue shades, whereby dyeings having good fastness properties are obtained.

EXAMPLES 164–217

In the following Tables 14 to 19 further compounds of formula I are listed by which formazan compounds of type (5) are exemplified. They may be prepared by a condensation comprising reacting an appropriate hydrazine compound, a diazonium compound and an aldehyde in the presence of copper salts by analogy with known methods. At the top of each of these Tables the corresponding formula is given in which the symbols are as defined in the following Table.

The compounds listed in Tables 14 to 19 dye cotton a dark blue shade whereby dyeings with good fastness properties are obtained.

TABLE 14
compounds of formula (T14)
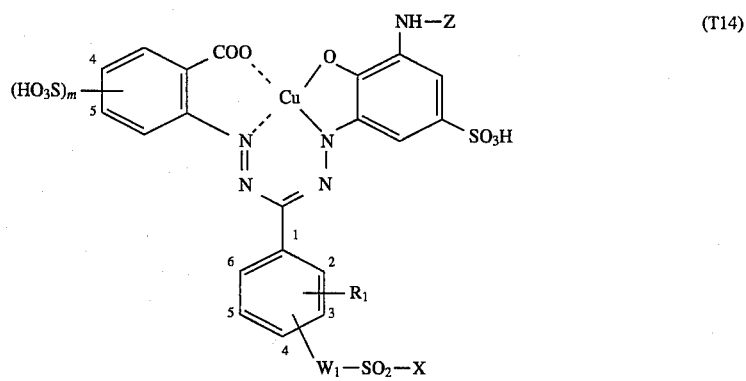
| Example No. | m | Position of —SO$_3$H | W$_1$ | X | Position of —W$_1$—SO$_2$—X | R$_1$ |
|---|---|---|---|---|---|---|
| 164 | 0 | — | direct bond | —CH$_2$CH$_2$OSO$_3$H | 4 | H |
| 165 | 1 | 4 | " | " | 4 | H |
| 166 | 1 | 5 | " | " | 4 | H |
| 167 | 0 | — | —*NHCONHCH$_2$CH$_2$— | " | 3 | SO$_3$H(4) |
| 168 | 1 | 4 | " | " | 4 | H |
| 169 | 1 | 5 | " | —CH=CH$_2$ | 3 | SO$_3$H(4) |
In W$_1$ the marked N-atom is attached to a carbon atom of the phenyl ring.
TABLE 15
compounds of formula (T15)
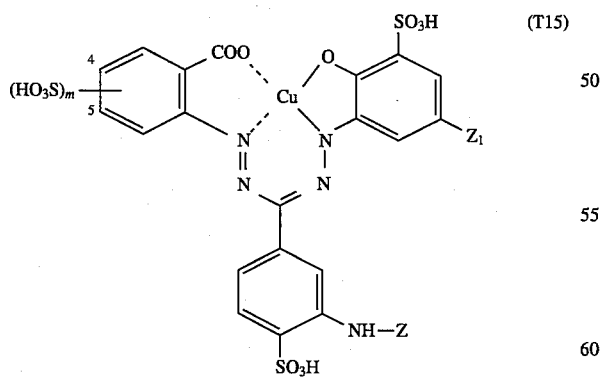
| Example No. | m | Position of —SO$_3$H |
|---|---|---|
| 170 | 0 | — |
| 171 | 1 | 4 |
| 172 | 1 | 5 |

TABLE 16 compounds of formula (T16)

(T16 structure: central Cu complex with X—O$_2$S—W$_1$—phenyl(positions 4,5)—COO→Cu, NH—Z and SO$_3$H on oxybenzene ring, N=N—N—N linkage to central phenyl ring with (SO$_3$H)$_q$ substituents)

| Example No. | W$_1$ | X | Position of —W$_1$—SO$_2$—X | q | Position of —SO$_3$H |
|---|---|---|---|---|---|
| 173 | direct bond | —CH$_2$CH$_2$OSO$_3$H | 4 | 0 | — |
| 174 | " | " | 4 | 1 | 4 |
| 175 | " | " | 4 | 2 | 2, 4 |
| 176 | " | " | 5 | 0 | — |
| 177 | " | " | 5 | 1 | 4 |
| 178 | " | " | 5 | 2 | 2, 4 |
| 179 | —*NHCONH—C$_6$H$_4$—CH$_3$ | " | 5 | 1 | 4 |
| 180 | " | " | 4 | 1 | 4 |
| 181 | " | —CH=CH$_3$ | 5 | 2 | 2, 4 |
| 182 | —*NHCONH—C$_6$H$_4$— (para) | —CH$_2$CH$_2$OSO$_3$H | 5 | 1 | 2 |
| 183 | —*NHCONHCH$_2$CH$_2$— | —CH$_2$CH$_2$OSO$_3$H | 5 | 1 | 4 |
| 184 | " | " | 4 | 1 | 4 |
| 185 | " | —CH=CH$_2$ | 5 | 2 | 2, 4 |

In W$_1$ the marked N-atom is attached to a carbon atom of the phenyl ring.

TABLE 17 compounds of formula (T17)

(T17 structure: X—O$_2$S—phenyl(4,5)—COO→Cu—O(2)—phenyl(3,4,5,6)—R$_1$, with SO$_3$H, NH—Z, linked via N=N—N—N to central phenyl bearing NH—Z and SO$_3$H)

| Example No. | X | Position of —SO$_2$—X | R$_1$ | Position of —SO$_3$H |
|---|---|---|---|---|
| 186 | —CH$_2$CH$_2$OSO$_3$H | 4 | SO$_3$H(3) | 5 |

TABLE 17-continued
compounds of formula (T17)
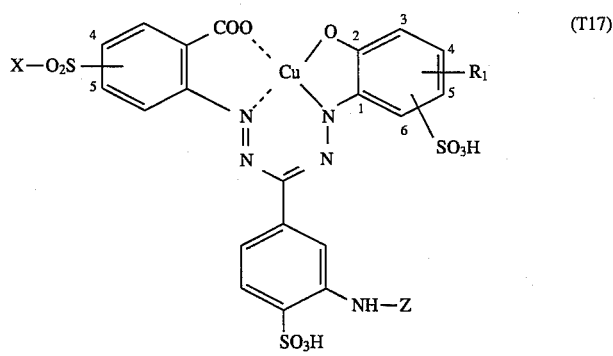
(T17)
| Example No. | X | Position of $-SO_2-X$ | $R_1$ | Position of $-SO_3H$ |
|---|---|---|---|---|
| 187 | $-CH=CH_2$ | 5 | " | 5 |
| 188 | $-CH_2CH_2OSO_3H$ | 5 | " | 5 |
| 189 | " | 5 | Cl(3) | 5 |
| 190 | " | 4 | " | 5 |
| 191 | " | 4 | Cl(5) | 3 |
| 192 | " | 5 | " | 3 |
TABLE 18
compounds of formula (T18)
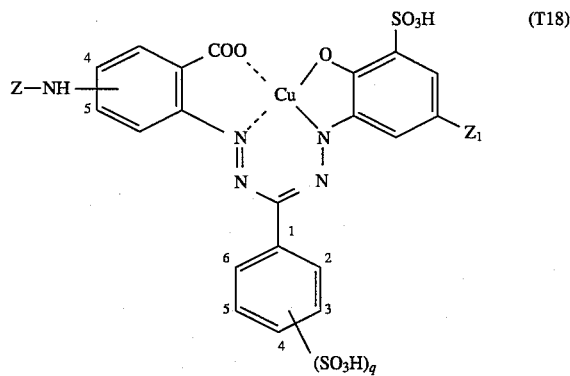
(T18)
| Example No. | Position of $-NH-Z$ | q | Position of $-SO_3H$ |
|---|---|---|---|
| 193 | 4 | 1 | 2 |
| 194 | 4 | 0 | — |
| 195 | 4 | 1 | 4 |
| 196 | 4 | 2 | 2, 4 |
| 197 | 5 | 1 | 2 |
| 198 | 5 | 1 | 4 |
| 199 | 5 | 2 | 2, 4 |
TABLE 18-continued
compounds of formula (T18)
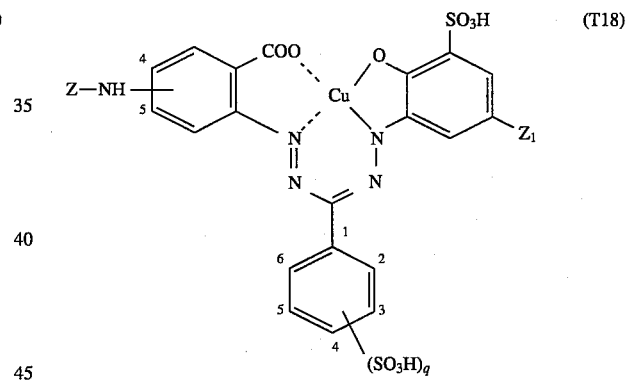
(T18)
| Example No. | Position of $-NH-Z$ | q | Position of $-SO_3H$ |
|---|---|---|---|
| 200 | 5 | 0 | — |

TABLE 19 compounds of formula (T19)

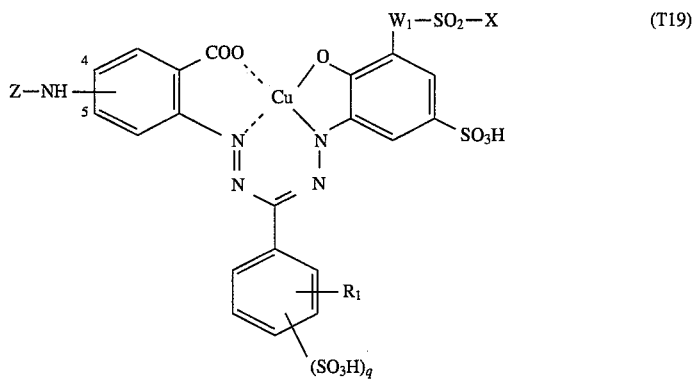

| Example No. | Position of —NH—Z | $W_1$ | X | q | Position of —$SO_3H$ |
|---|---|---|---|---|---|
| 201 | 4 | —*NHCONHCH$_2$CH$_2$— | —CH$_2$CH$_2$OSO$_3$H | 1 | 2 |
| 202 | 4 | " | " | 0 | — |
| 203 | 4 | " | " | 1 | 4 |
| 204 | 5 | " | " | 1 | 2 |
| 205 | 5 | " | " | 0 | — |
| 206 | 5 | " | " | 1 | 4 |
| 207 | 5 | " | —CH=CH$_2$ | 2 | 2, 4 |
| 208 | 4 | " | " | 2 | 2, 4 |
| 209 | 5 | —*NHCONH—C$_6$H$_4$— | —CH=CH$_2$ | 2 | 2, 4 |
| 210 | 4 | " | " | 2 | 2, 4 |
| 211 | 4 | " | —CH$_2$CH$_2$OSO$_3$H | 1 | 2 |
| 212 | 4 | " | " | 0 | — |
| 213 | 4 | " | " | 1 | 4 |
| 214 | 5 | " | " | 1 | 2 |
| 215 | 5 | " | " | 0 | — |
| 216 | 5 | " | " | 1 | 4 |
| 217 | 4 | —*NHCONH—C$_6$H$_4$— | " | 1 | 2 |

In $W_1$ the marked N-atom is attached to a carbon atom of the phenyl ring.

EXAMPLE 218

10-Parts of 1,4-dichloro-5,8-dihydroxyanthraquinone together with 10 parts of 2,4-diaminotoluene and 10 parts of sodium acetate are stirred in 100 parts of ortho-dichlorobenzene at 130° during 24 hours. While cooling down the compound (218a)

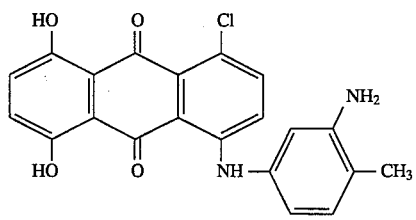

precipitates from the reaction mixture. This compound is collected by filtration, washed with a small amount of nitrobenzene and stirred together with 15 parts of 4-(2'-hydroxyethyl)sulfonylaniline and 10 parts of sodium acetate in 100 parts of nitrobenzene at 155° over a period of 30 hours. The dye base (218b) precipitates; it is filtered and washed clean with ethanol and dried. Subsequently, this compound (218b) is converted in sulfuric acid in a manner known per se to yield the compound (218c)

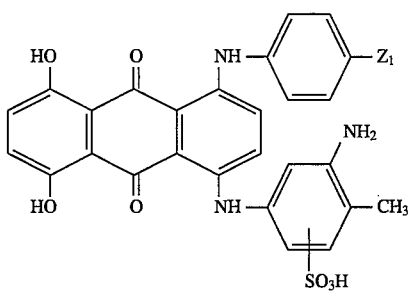

7.2 Parts of the compound (218c) are dissolved in 150 parts of water at pH 7. At 25° an acetone solution of 2.5 parts (20% by weight excess) of 5-cyano-2,4,6-trichloropyrimidine is added thereto in one portion. After 3 to 4 hours the reaction is complete which can be proved by thin layer chromatography.

To isolate the reaction product, sodium chloride is strewed into the mixture while stirring. The precipitate is collected by filtration and dried in vacuo at 500. The obtaine dye has the formula

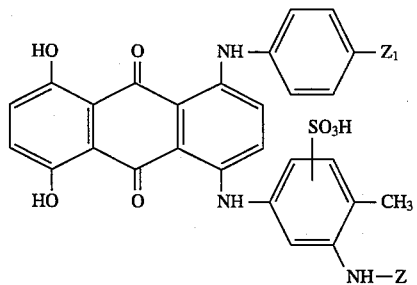

and dyes cotton a brilliant green shade. These dyeings exhibit good fastness properties.

EXAMPLES 219–225

By analogy with the method described in Example 1 or 2, using appropriate starting compounds, further metal-free monoazo compounds may be prepared which are listed in the following Table 20. They correspond to formula (T20)

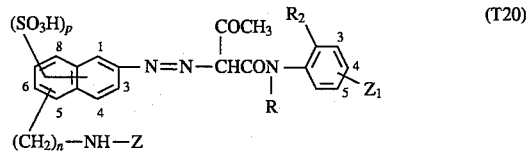

in which the symbols are as defined in Table 20. The compounds of Examples 219 to 225 dye cotton in greenish yellow tones. These dyeings exhibit good fastness properties.

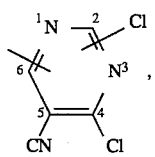

one compound in which the floating chlorine substituent on the pyrimidine ring is in the 2-position and the corresponding compound wherein it is in the 6-position, with the former usually predominating, often by a ratio of about 2:1. These isomeric mixtures may be used in conventional dyeing or printing processes; the isolation of a single isomer for use normally is unnecessary.

In the following examples, the application of compounds of this invention is illustrated.

APPLICATION EXAMPLE A 0.3 Part of the dye of Example 1 is dissolved in 300 parts of demineralised water and 15 parts of Glauber's salt (calcined) is added. The dyebath is heated to 40°, then 10 parts of cotton fabric (bleached) is added. After 30 minutes at 40°, 6 parts of sodium carbonate (calcined) are added to the bath portionwise every 10 minutes applying quantities of 0.2, 0.6, 1.2 and finally 4.0 parts thereof. During the addition of sodium carbonate the temperature is kept at 40°. Subsequently, dyeing is effected for a further one hour at 40°.

The dyed fabric is then rinsed with running cold water for 3 minutes and afterwards with running hot water for a further 3 minutes. The dyeing is washed at the boil for 15 minutes in 500 parts of demineralised water in the presence of 0.25 part of Marseille soap. After being rinsed with running hot water (for 3 minutes) and centrifuged, the dyeing is dried in a cabinet dryer at about 70°. A greenish-yellow cotton dyeing is obtained showing good light- and wet-fastness properties which is stable towards oxidative influences.

APPLICATION EXAMPLE B

To a dyebath containing in 300 parts of demineralised water 10 parts of Glauber's salt (calcined), 10 parts of cotton

TABLE 20 compounds of formula (T20)

| Example No. | p | position of $(SO_3H)_p$ | n | position of $-(CH_2)_n NHZ$ | R | $R_2$ | position of $-Z_1$ |
|---|---|---|---|---|---|---|---|
| 219 | 2 | 4, 8 | 0 | 6 | H | H | 3 |
| 220 | 2 | 4, 8 | 0 | 6 | $CH_3$ | $SO_3H$ | 4 |
| 221 | 2 | 4, 8 | 0 | 6 | H | " | 5 |
| 222 | 1 | 1 | 1 | 5 | H | $OCH_3$ | 4 |
| 223 | 1 | 1 | 1 | 5 | $CH_3$ | H | 3 |
| 224 | 1 | 1 | 1 | 5 | H | $SO_3H$ | 5 |
| 225 | 1 | 1 | 1 | 5 | H | H | 3 |

By the preparation methods described in the preceding examples, the compounds of Examples 1–225 are obtained in sodium salt form. By changing the reaction or isolation conditions or by using other known methods, it is possible to produce the compounds in the form of free acid or in other salt forms or mixed salt forms which contain one or more of the cations mentioned hereinabove.

As already mentioned, the dyes of Examples 1 to 225 (and the corresponding free acids and other salt forms) contain two isomeric compounds regarding the group Z fabric (bleached) is added. The bath is heated to 40° over a period of 10 minutes, and 0.5 part of the dye of Example 1 is added. After a further 30 minutes at 40°, 3 parts of sodium carbonate (calcined) is added and dyeing is continued at 40° for a further 45 minutes.

The dyed fabric is rinsed with running cold and then hot water and washed at the boil according to the method given in Application Example A. After rinsing and drying, a greenish-yellow cotton dyeing is obtained which has the same good fastness properties as indicated in Application Example A.

Similarly, the dyes of Examples 2–225 or mixtures of the exemplified dyes may be employed to dye cotton in accordance with the method described in Application Example A or B. The cotton dyeings thus obtained exhibit good fastness properties.

APPLICATION EXAMPLE C

A printing paste consisting of

| |
|---|
| 40 parts of the dye of Example 1 |
| 100 parts of urea |
| 350 parts of water |
| 500 parts of a 4% by weight sodium alginate thickener and |
| 10 parts of sodium bicarbonate |
| 1000 parts | is applied to cotton fabric in accordance with conventional printing methods.

The printed fabric is dried and fixed in steam at 102°–104° for 4–8 minutes. It is rinsed in cold and then hot water, washed at the boil (according to the method described in Application Example A) and dried. A greenish-yellow print is obtained which has good general fastness properties.

Similarly, the dyes of Examples 2 to 225 or mixtures of the exemplified dyes may be employed to print cotton in accordance with the method given in Application Example C. All prints obtained exhibit good fastness properties.

What is claimed is:

1. A compound of the formula

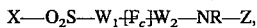

or a water-soluble salt thereof each cation of which is independently a non-chromophoric cation, or a mixture of such compounds or water-soluble salts, wherein $F_c$ is a chromophore-containing radical of a monoazo, disazo or polyazo, dye, which is in metal-free or metal complex form, each of $W_1$ and $W_2$ is independently a direct bond or a bridging group which is attached to a carbon atom of an aromatic carbocyclic ring or to a carbon or nitrogen atom of an aromatic heterocyclic ring present in $F_c$, X is —CH=CH$_2$ or linear or branched C$_{2-4}$alkylene-Y, wherein Y is hydroxy or a group which can be split off under alkaline conditions, R is hydrogen, C$_{1-4}$alkyl or C$_{1-4}$alkyl monosubstituted by hydroxy, halo, cyano, —SO$_3$H, —OSO$_3$H or —COOH, and Z is

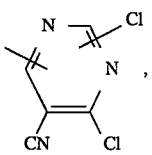

with the provisos that (1) —[F$_c$]— does not contain any additional fiber-reactive group, and (2) when —[F$_c$]— is the radical of a monoazo dye containing a group (x) as the diazo component radical and a group (y) as the coupling component radical,

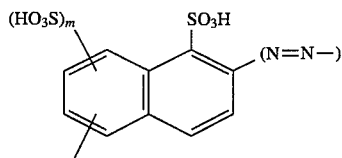

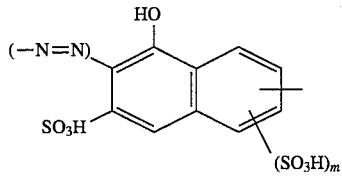

wherein each m is 0 or 1, then either (2.1) (x) bears the —W$_2$—NR—Z group and (y) bears the —W$_1$—SO$_2$—X group or (2.2) (x) bears the —W$_1$—SO$_2$—X group, (y) bears the —W$_2$—NR—Z group, and W$_2$ is other than a direct bond.

2. A compound according to claim 1, or a water-soluble salt thereof each cation of which is independently a non-chromophoric cation, or a mixture of such compounds or water-soluble salts, wherein Y is hydroxy, —OSO$_3$H, chloro, bromo, —OPO$_3$H$_2$, —SSO H, —OCOCH$_3$, —OCOC$_6$H$_5$ or —OSO$_2$CH$_3$.

3. A compound according to claim 2, or a water-soluble salt thereof each cation of which is independently a non-chromophoric cation, or a mixture of such compounds or water-soluble salts, wherein X is —CH=CH$_2$ or —CH$_2$CH$_2$OSO$_3$H.

4. A compound according to claim 1, or a water-soluble salt thereof each cation of which is independently a non-chromophoric cations, or a mixture of such compounds or water-soluble salts, wherein R is hydrogen methyl, ethyl, 2-hydroxyethyl, —(CH$_2$)$_r$—SO$_3$H, —(CH$_2$)$_r$—OSO$_3$H or —(CH$_2$)$_r$—COOH, wherein r is 1, 2, or 3.

5. A compound according to claim 1, or a water-soluble salt thereof each cation of which is independently a non-chromophoric cation, or a mixture of such compounds or water-soluble salts, wherein W$_1$ is a direct bond, straight chain C$_{1-4}$alkylene, —Wc—O—Wc— or

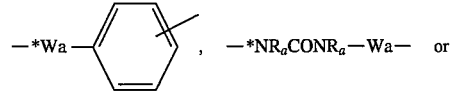

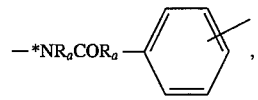

wherein each R$_a$ is independently hydrogen, methyl, ethyl, 2-hydroxyethyl, —(CH$_2$)$_r$—SO$_3$H, —(CH$_2$)$_r$—OSO$_3$H or —(CH$_2$)$_r$—COOH, wherein r is 1, 2 or 3, each Wa is independently linear or branched C$_{1-4}$alkylene, each Wc is independently linear or branched C$_{2-3}$alkylene, each free bond on a phenyl ring is in the meta- or para-position, and the atom denoted with an * is attached to —[F$_c$]—

6. A compound according to claim 5, or a water-soluble salt thereof each cation of which is independently a non-chromophoric cation, or a mixture of such compounds or water-soluble salts, wherein W$_1$ is a direct bond.

7. A compound according to claim 1, or a water-soluble salt thereof each cation of which is independently a non-chromophoric cation, or a mixture of such compounds or water-soluble salts, wherein $W_2$ is a direct bond, linear or branched $C_{1-4}$alkylene, linear or branched $C_{2-4}$alkylene monosubstituted by hydroxy or

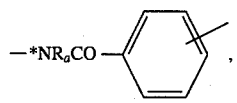

wherein $R_a$ is hydrogen, methyl, ethyl, 2-hydroxyethyl, $-(CH_2)_r-SO_3H$, $-(CH_2)_r-OSO_3H$ or $-(CH_2)_r-COOH$, wherein r is 1, 2 or 3, the free bond on the phenyl ring is in the meta- or para-position, and the * denotes the nitrogen atom attached to $-[F_c]-$.

8. A compound of the formula

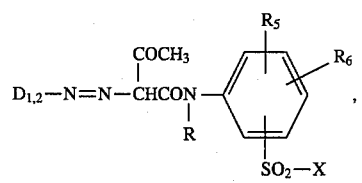

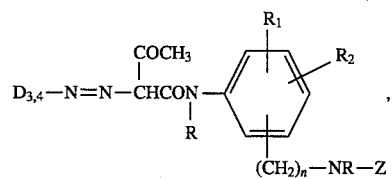

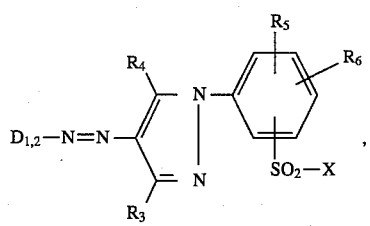

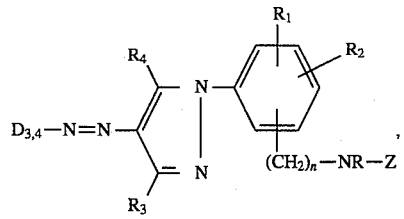

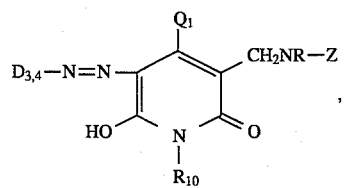

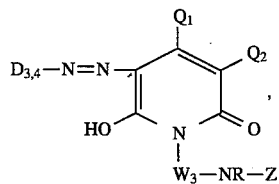

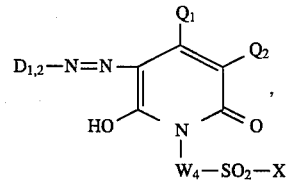

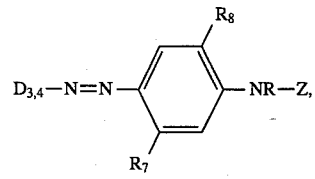

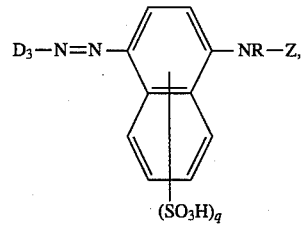

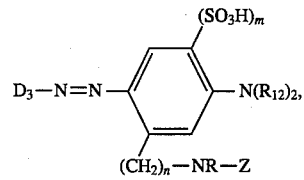

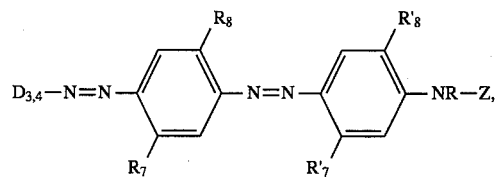

-continued

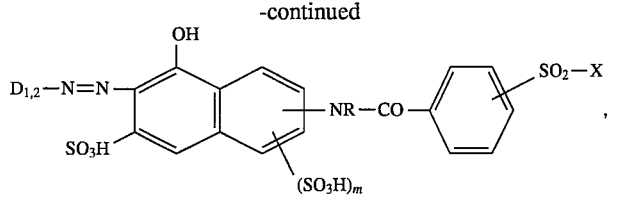

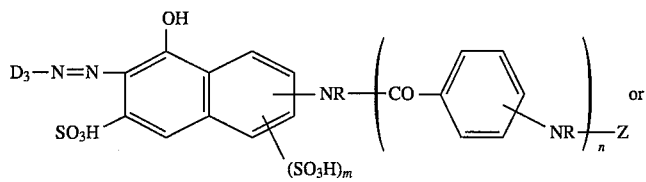

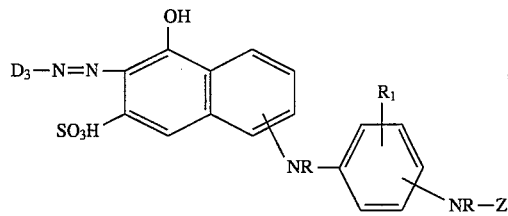

or a water-soluble salt thereof each cation of which is independently a non-chromophoric cation, or a mixture of such compounds or water-soluble salts, wherein $D_{1,2}$ is $D_1$ or $D_2$, where $D_1$ is

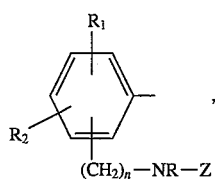

and $D_2$ is

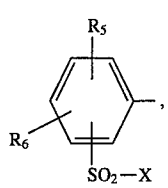

wherein p is 1 or 2, $D_3$ is as defined below, $D_{3,4}$ is $D_3$ or $D_4$, where $D_3$ is

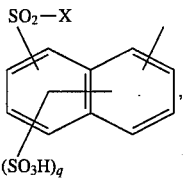

and $D_4$ is

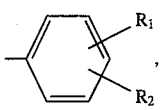

$Q_1$ is hydrogen; $C_{1-4}$alkyl; $C_{5-6}$cycloalkyl; phenyl; phenyl($C_{1-4}$alkyl); phenyl substituted by 1 to 3 substituents independently selected from $C_{1-4}$alkyl, $C_{1-4}$alkoxy, halo, —$SO_3H$ and —COOH; phenyl($C_{1-4}$alkyl) the phenyl ring of which is substituted by 1 to 3 substituents independently selected from $C_{1-4}$alkyl, $C_{1-4}$alkoxy, halo, —$SO_3H$ and —COOH; —$COR_{11}$ or $C_{1-4}$—alkyl monosubstituted by —$SO_3H$, —$OSO_3H$ or —$COR_{11}$, $Q_2$ is hydrogen; cyano; —$SO_3H$; —$COR_{11}$; $C_{1-4}$alkyl; $C_{1-4}$alkyl monosubstituted by hydroxy, halo, cyano, $C_{1-4}$alkoxy,

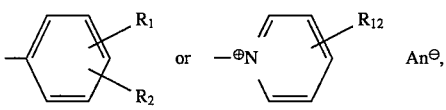

—$SO_3H$, —$OSO_{13}H$ or —$NH_2$;

wherein $An^\ominus$ is a non-chromophoric anion, $R_3$ is methyl, —COOH or —$CONH_2$, $R_4$ is hydroxy or —$NH_2$, each of $R_7$ and $R'_7$ is independently hydrogen, $C_{1-4}$alkyl, $C_{1-4}$alkoxy, ($C_{1-4}$alkyl)carbonylamino or —NHCONH$_2$, each of $R_8$ and $R'_8$ is independently hydrogen, $C_{1-4}$alkyl, $C_{1-4}$alkoxy or —$SO_3H$, $R_{10}$ is hydrogen or $C_{1-4}$alkyl, $W_3$ is linear or branched $C_{2-4}$alkylene or linear or branched $C_{3-4}$alkylene monosubstituted by hydroxy, $W_4$ is linear or branched $C_{2-4}$alkylene, —Wc—O—Wc—, —Wc—NR—Wc— or

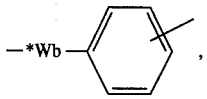

wherein Wb is linear or branched $C_{2-4}$alkylene, each Wc is independently linear or branched $C_{2-3}$alkylene, and the * denotes the carbon atom attached to the nitrogen atom of the pyridone ring, and m is 0 or 1, wherein each R is independently hydrogen, $C_{1-4}$alkyl or $C_{1-4}$alkyl monosubstituted by hydroxy, halo, cyano, —SO$_3$H, —OSO$_3$H or —COOH, each $R_1$ and $R_2$ is independently hydrogen, halo, $C_{1-4}$alkyl, $C_{1-4}$alkoxy, —COOH or —SO$_3$H, $R_5$ is hydrogen, halo, $C_{1-4}$alkyl, $C_{1-4}$alkoxy, —COOH or —SO$_3$H, $R_6$ is hydrogen, halo, $C_{1-4}$alkyl or $C_{1-4}$alkoxy, each $R_{11}$ is independently hydroxy, —NH$_2$ or $C_{1-4}$alkoxy, each $R_{12}$ is independently hydrogen, $C_{1-4}$alkyl or $C_{2-4}$—hydroxyalkyl, X is —CH=CH$_2$ or -linear or branched $C_{2-4}$alkylene-Y, wherein Y is hydroxy or a group which can be split off under alkaline conditions, Z is

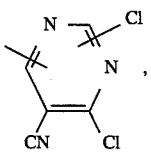

n is 0 or 1, and q is 0,1 or 2.

9. A compound according to claim 8, or a water-soluble salt thereof each cation of which is independently a non-chromophoric cation, or a mixture of such compounds or water-soluble salts, wherein each R is independently hydrogen, methyl, ethyl, 2-hydroxyethyl, —(CH$_2$)$_r$—SO$_3$H, —(CH$_2$)$_r$—OSO$_3$H or —(CH$_2$)$_r$—COOH, wherein r is 1, 2 or 3, and X is —CH=CH$_2$ or —Wb—Y', wherein Wb is linear or branched $C_{2-4}$alkylene, and Y' is hydroxy, —OSO$_3$H, chloro, bromo, —OPO$_3$H$_2$, —SSO$_3$H, —OCOCH$_3$, —OCOC$_6$H$_5$ or —OSO2CH$_3$.

10. A compound according to claim 9, or a water-soluble salt thereof each cation of which is independently a non-chromophoric cation, or a mixture of such compounds or water-soluble salts, wherein X is —CH=CH$_2$ or —CH$_2$CH$_2$OSO$_3$H.

11. A compound according to claim 9, or a water-soluble salt thereof each cation of which is independently a non-chromophoric cation, or a mixture of such compounds or water-soluble salts, wherein $D_1$ is

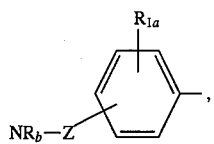

wherein $R_{1a}$ is hydrogen, methyl, methoxy, —COOH or —SO$_3$3, $D_2$ is

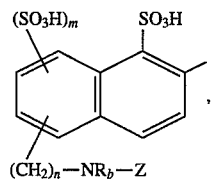

wherein m is 0 or 1, $D_3$ is

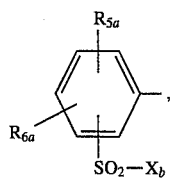

wherein $R_{5a}$ is hydrogen, methyl, methoxy, —COOH or —SO$_3$H, and $R_{6a}$ is hydrogen, methyl or methoxy, $D_4$ is

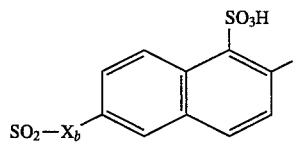

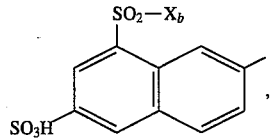

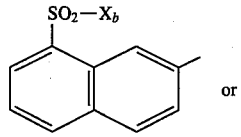

or

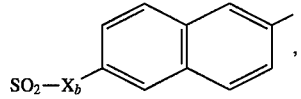

$Q_1$ is hydrogen, methyl, ethyl, phenyl, —COR$_{11}$, —CH$_2$SO$_3$H or —CH$_2$OSO$_3$H, and $Q_2$ is hydrogen, cyano, —SO$_3$H, —COR$_{11}$, methyl, ethyl or —CH$_2$SO$_3$H, wherein each R and $R_b$ is independently hydrogen or methyl, and each of X and $X_b$ is —CH=CH$_2$, —CH$_2$CH$_2$OH or —CH$_2$CH$_2$OSO$_3$H.

12. A compound according to claim 9 having the formula

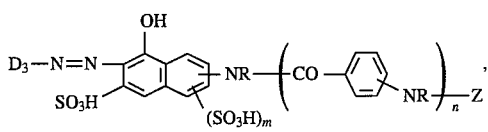

or a water-soluble salt thereof each cation of which is independently a non-chromophoric cation, or a mixture of such compounds or water-soluble salts.

13. A compound according to claim 12, or a water-soluble salt thereof each cation of which is independently a non-chromophoric cation, or a mixture of such compounds or water-soluble salts, wherein $D_3$ is

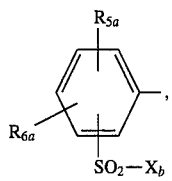

wherein $R_{5a}$ is hydrogen, methyl, methoxy, —COOH or —SO$_3$H, $R_{6a}$ is hydrogen, methyl or methoxy, and $X_b$ is —CH=CH$_2$, —CH$_2$CH$_2$OH or —CH$_2$CH$_2$OSO$_3$H, and R is hydrogen or methyl.

14. A compound according to claim 13, or a water-soluble salt thereof each cation of which is independently a non-chromophoric cation, or a mixture of such compounds or water-soluble salts, wherein n is 0.

15. A compound according to claim 14 having the formula

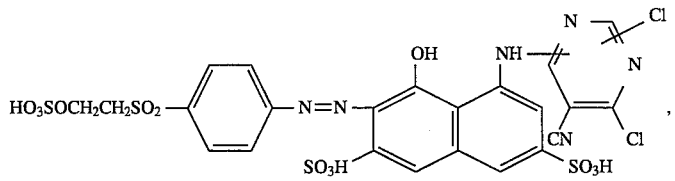

or a water-soluble salt thereof each cation of which is independently a non-chromophoric cation, or a mixture of such compounds or water-soluble salts.

16. A metal complex according to claim 1 having the formula

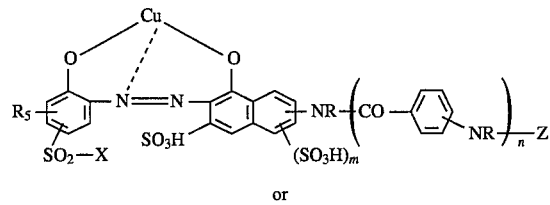

or

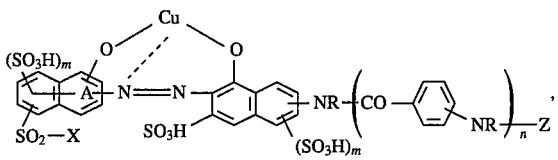

or a water-soluble salt thereof each cation of which is independently a non-chromophoric cation, or a mixture of such metal complexes or water-soluble salts, wherein $R_5$ is hydrogen, halo, $C_{1-4}$alkyl, $C_{1-4}$alkoxy, —COOH or —SO$_3$H, each m is independently 0 or 1, n is 0 or 1, and the —O— and —N=N— attached to Ring A are ortho to each other and are in the 1,2- or 2,1-positions.

17. A metal complex according to claim 1, or a water-soluble salt thereof each cation of which is independently a non-chromophoric cation, or a mixture of such metal complexes or water-soluble salts, wherein each R is independently hydrogen, methyl, ethyl, 2-hydroxyethyl, —(CH$_2$)$_r$—SO$_3$H, —(CH$_2$)$_r$—OSO$_3$H or —(CH$_2$)$_r$—COOH, wherein r is 1, 2 or 3, and X is —CH=CH$_2$ or —Wb—Y', wherein Wb is linear or branched $C_{2-4}$alkylene, and Y' is hydroxy, —OSO$_3$H, chloro, bromo, —OPO$_3$H$_2$, —SSO$_3$H, —OCOCH$_3$, —OCOC$_6$H$_5$ or —OSO$_2$CH$_3$.

18. A metal complex according to claim 1 which is (i) a 1:2 cobalt or 1:2 chromium complex of a monoazo compound of the formula

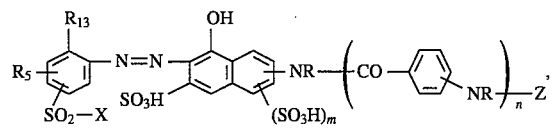

(ii) a 1:2 cobalt or 1:2 chromium complex of two different monoazo compounds of the formula

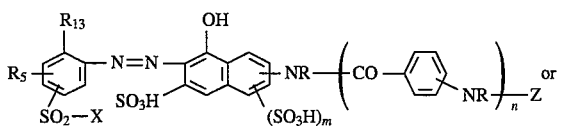

(iii) a 1:2 cobalt or 1:2 chromium complex of a monoazo compound of the formula

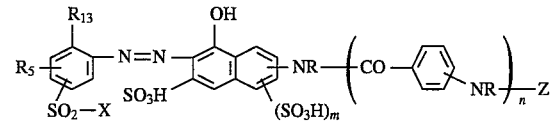

and another dye capable of forming a metal complex, or a water-soluble salt thereof each cation of which is independently a non-chromophoric cation, or a mixture of such metal complexes or water-soluble salts, wherein $R_5$ is hydrogen, halo, $C_{1-4}$alkyl, $C_{1-4}$alkoxy, —COOH or —SO$_3$H, $R_{13}$ is hydroxy, —NH$_2$ or —COOH, m is 0 or 1, and n is 0 or 1.

19. A metal complex according to claim 18, or a water-soluble salt thereof each cation of which is independently a non-chromophoric cation, or a mixture of such metal complexes or water-soluble salts, wherein each R is independently hydrogen, methyl, ethyl, 2-hydroxyethyl, —(CH$_2$)$_r$—SO$_3$H, —(CH$_2$)$_r$—OSO$_3$H or —(CH$_2$)$_r$—COOH, wherein r is 1, 2 or 3, and X is —CH=CH$_2$ or —Wb—Y', wherein Wb is linear or branched C$_{2-4}$alkylene, and Y' is hydroxy, —OSO$_3$H, chloro, bromo, —OPO$_3$H$_2$, —SSO$_3$H, —OCOCH$_3$, —OCOC$_6$H$_5$ or —OSO$_2$CH$_3$.

20. A metal complex of the formula m is 0 or 1, n is 0 or 1, and

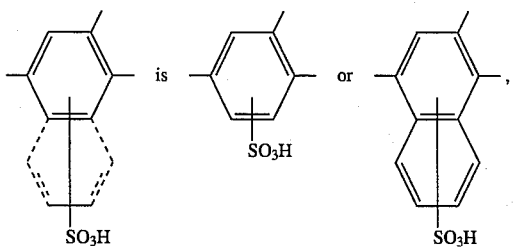

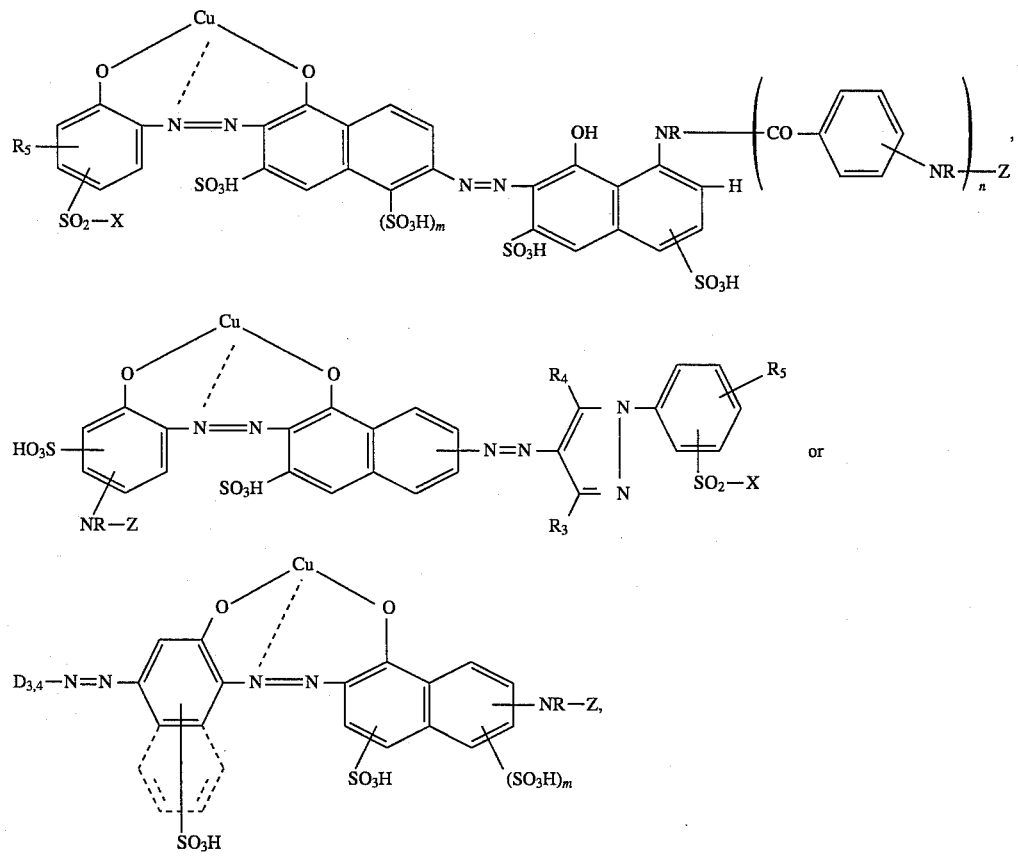

or a water-soluble salt thereof each cation of which is independently a non-chromophoric cation, or a mixture of such metal complexes or water-soluble salts, wherein D$_{3,4}$ is

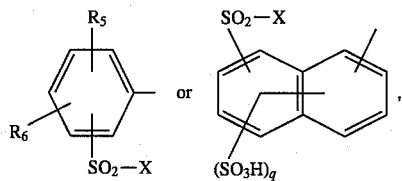

wherein R$_6$ is hydrogen, halo, C$_{1-4}$alkyl or C$_{1-4}$alkoxy, and q is 0, 1 or 2, R$_3$ is methyl, —COOH or —CONH$_2$, R$_4$ is hydroxy or —NH$_2$, wherein each R is independently hydrogen, C$_{1-4}$alkyl or C$_{1-4}$alkyl monosubstituted by hydroxy, halo, cyano, —SO$_3$H, —OSO3H or —COOH, R$_5$ is hydrogen, halo, C$_{1-4}$alkyl, C$_{1-4}$alkoxy, —COOH or —SO$_3$H, X is —CH=CH$_2$ or -linear or branched C$_{2-4}$alkylene—Y, wherein Y is hydroxy or a group which can be split off under alkaline conditions, and Z is

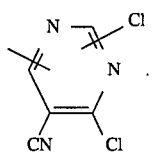

21. A metal complex according to claim 20, or a water-soluble salt thereof each cation of which is independently a non-chromophoric cation, or a mixture of such metal complexes or water-soluble salts, wherein each R is independently hydrogen, methyl, ethyl, 2-hydroxyethyl, —$(CH_2)_r$—SO$_3$H, —$(CH_2)_r$—OSO$_3$H or —$(CH_2)_r$—COOH, wherein r is 1, 2 or 3, and X is —CH=CH$_2$ or —Wb—Y', wherein Wb is linear or branched $C_{2-4}$alkylene, and Y' is hydroxy, —OSO$_3$H, chloro, bromo, —OPO$_3$H$_2$, —SSO$_3$H, —OCOCH$_3$, —OCOC$_6$H$_5$ or —OSO2CH$_3$.

22. A process for dyeing or printing an hydroxy group- or nitrogen-containing organic substrate comprising applying to an hydroxy group- or nitrogen-containing organic substrate a compound according to claim 1, or a water-soluble salt thereof each cation, of which is independently a non-chromophoric cation, or a mixture of such compounds or water-soluble salts.

* * * * *